United States Patent
Araki et al.

(10) Patent No.: US 10,824,171 B2
(45) Date of Patent: Nov. 3, 2020

(54) INTERCEPTION PROBABILITY CALCULATION SYSTEM, FLYING OBJECT AND INTERCEPTION PROBABILITY CALCULATING METHOD

(71) Applicant: MITSUBISHI HEAVY INDUSTRIES, LTD., Tokyo (JP)

(72) Inventors: Shunsuke Araki, Tokyo (JP); Kazuhiro Yamada, Tokyo (JP); Keisuke Ando, Tokyo (JP); Yasuhiro Toyoda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 372 days.

(21) Appl. No.: 15/896,555

(22) Filed: Feb. 14, 2018

(65) Prior Publication Data
US 2020/0159255 A1    May 21, 2020

(30) Foreign Application Priority Data
Sep. 5, 2017    (JP) .................. 2017-169971

(51) Int. Cl.
  *G05D 1/12*    (2006.01)
  *B64C 39/02*    (2006.01)
  *G06F 17/18*    (2006.01)
  *G06K 9/00*    (2006.01)
(52) U.S. Cl.
  CPC .............. *G05D 1/12* (2013.01); *B64C 39/024* (2013.01); *G06F 17/18* (2013.01); *G06K 9/0063* (2013.01); *B64C 2201/08* (2013.01); *B64C 2201/12* (2013.01)
(58) Field of Classification Search
  CPC ........ G05D 1/12; G05D 1/107; B64C 39/024; B64C 2201/18; B64C 2201/12; G06F 17/18; G06K 9/0063
  See application file for complete search history.

(56) References Cited

U.S. PATENT DOCUMENTS

| | | | |
|---|---|---|---|
| 2010/0198514 A1* | 8/2010 | Miralles | G08G 5/0069 701/302 |
| 2011/0147515 A1* | 6/2011 | Miller | B64C 39/028 244/63 |
| 2014/0172200 A1* | 6/2014 | Miralles | G05D 1/12 701/3 |
| 2019/0249957 A1* | 8/2019 | Ando | G05D 1/12 |
| 2019/0360783 A1* | 11/2019 | Whittaker | F41H 11/02 |
| 2020/0057456 A1* | 2/2020 | Araki | F41G 7/343 |

FOREIGN PATENT DOCUMENTS

JP    3-39897    2/1991

* cited by examiner

*Primary Examiner* — Rodney A Bonnette
(74) *Attorney, Agent, or Firm* — Wenderoth, Lind & Ponack, L.L.P.

(57) ABSTRACT

A launched flying object is configured to continue to transmit a signal to a launching device. The launching device is configured to continue to receive the signal from the launched flying object, continue to calculate a probability when the launched flying object intercepts a target from a distance, a relative velocity and a relative angle between the launched flying object and the target, and output a final interception probability when communication from the launched flying object is stopped.

16 Claims, 17 Drawing Sheets

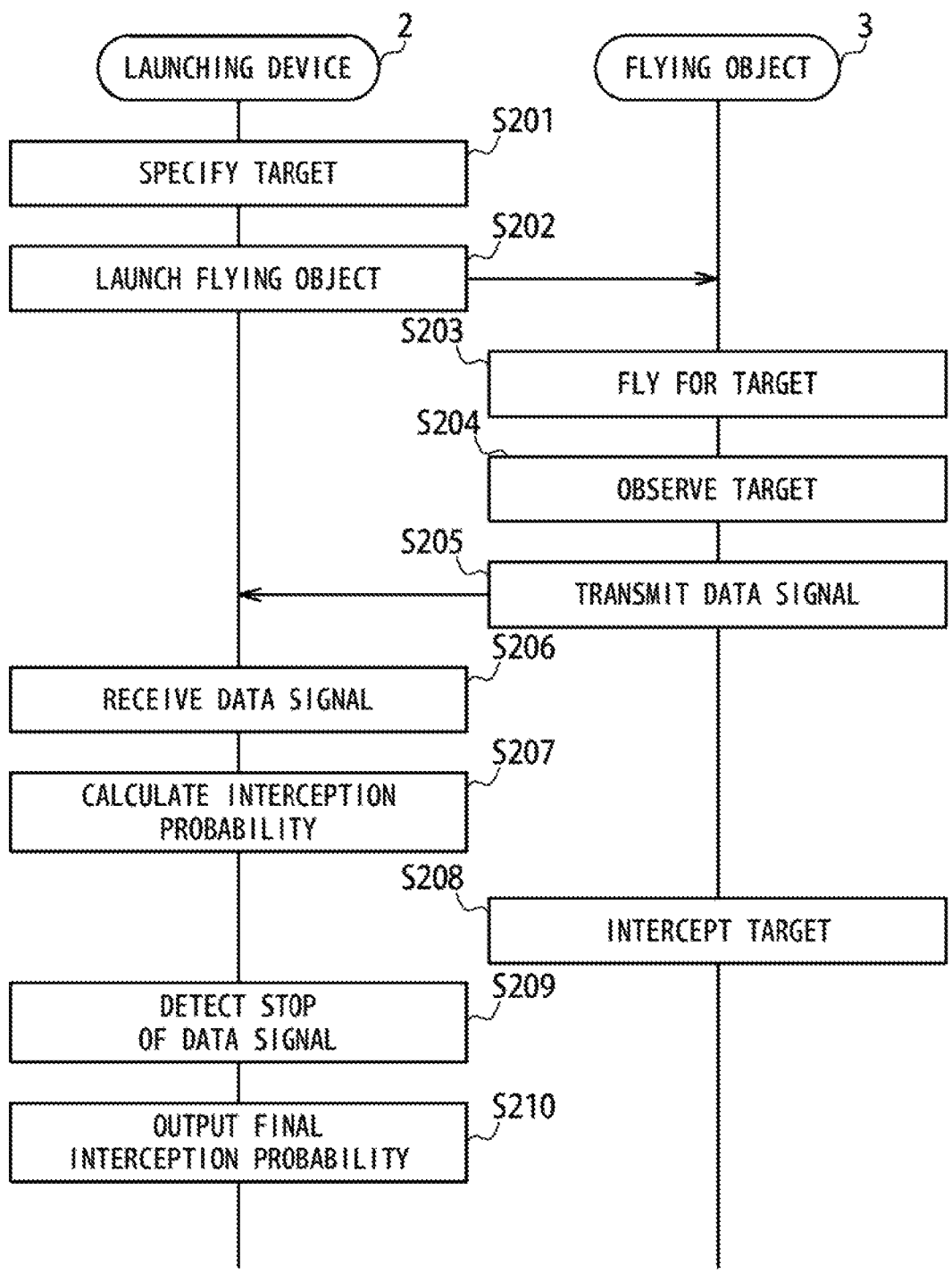

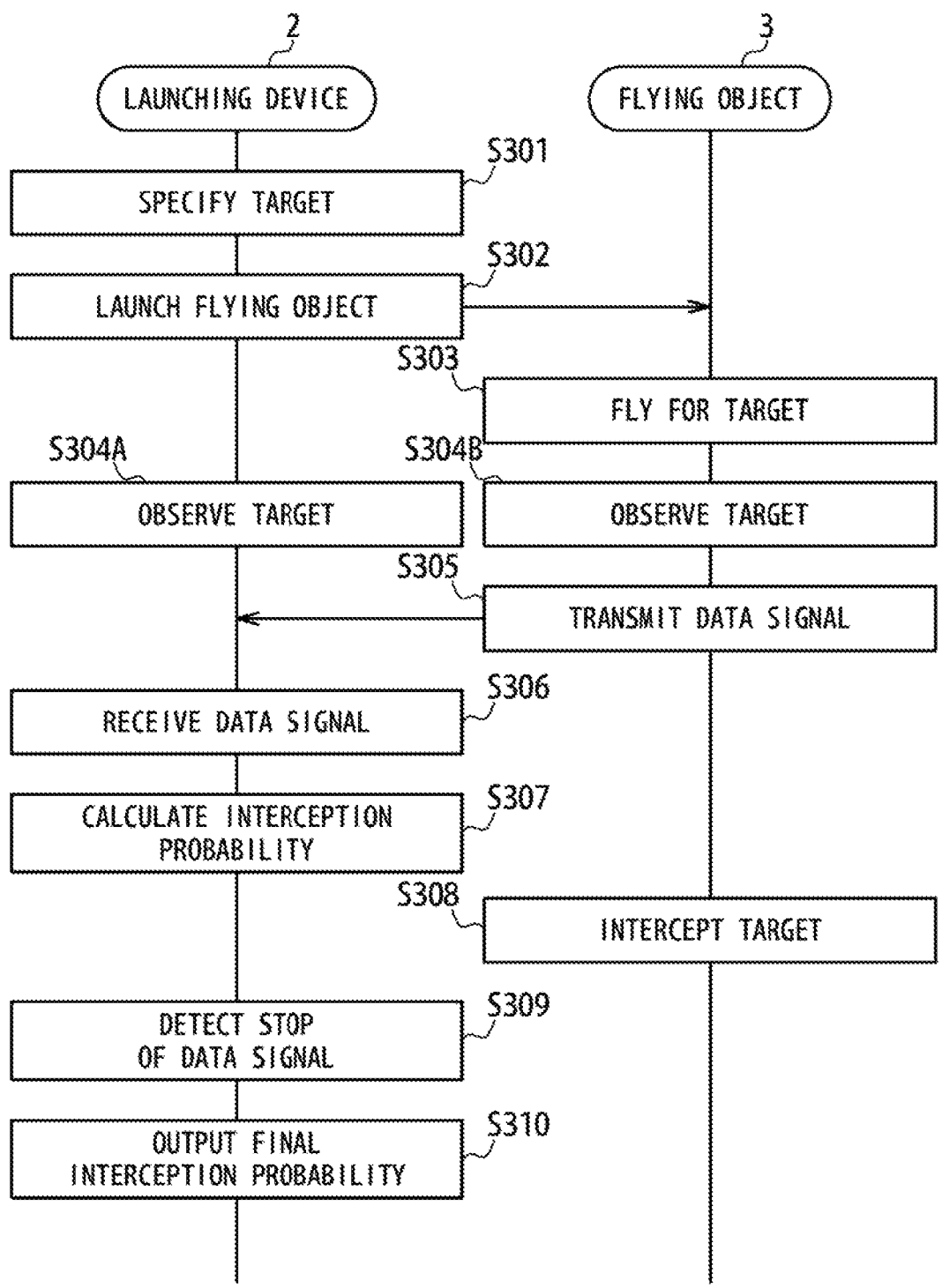

INTERCEPTION PROBABILITY CALCULATION SYSTEM, FLYING OBJECT AND INTERCEPTION PROBABILITY CALCULATING METHOD

TECHNICAL FIELD

The present invention relates to an interception probability calculation system, a flying object and an interception probability calculating method, especially, to the interception probability calculation system, the flying object and the interception probability calculating method, in which an interception probability of a target by a flying object is calculated.

BACKGROUND ART

It is considered a case that a flying object launched from a launching device to intercept a target succeeds in interception and fails in interception. In case of succeeding in the interception, the launching device may launch a next flying object to intercept another target. Oppositely, in case of failing in the interception, the launching device may launch the next flying object to intercept the same target and may take an action to avoid a counterattack from this target.

In this way, a launching device has needs to know success or failure of the interception early as much as possible. To know the success or failure of interception, a method is known of determining by using radar or checking visually an imaging result of a gun camera and a bullet mark on a target.

In conjunction with the above, Japanese Unexamined Patent Application JP H03-39897A discloses a firing training apparatus. This firing training apparatus is featured by having a laser irradiation device, a laser oscillator and a laser detector. Here, an optical axis control of the laser irradiation device is carried out by a firing control computer which inputs a signal from radar and a navigation sensor which are provided for a training machine. The laser oscillator sends a laser beam to the laser irradiation device in response to a trigger signal sent from the firing control computer. The laser detector is provided for a target machine and the laser irradiation device provided for the training machine detects a shooting machine.

SUMMARY OF THE INVENTION

The present invention provides an interception probability calculation system and an interception probability calculating method, in which a launching device which has launched a flying object can earlier know the success or failure of interception of a target by the flying object. Other problems and new features will become clear from the description of this Specification and the attached drawings.

According to an embodiment, the interception probability calculation system contains a flying object and a launching device. The launching device launches a flying object. The flying object flies for a target. The flying object has a first sensor device, a first processing unit and a first communication device.

The first sensor device observes a peripheral situation of the flying object and outputs first observation data showing the observation result. The first processing unit generates a data signal which contains the first observation data. The first communication device transmits the data signal to the launching device. The launching device is composed of a second sensor device, a second communication device and a second processing unit. The second sensor device observes a peripheral situation of the launching device and outputs second observation data showing the observation result. The second communication device receives the data signal. The second processing unit outputs an interception probability showing the probability that the flying object succeeds in the interception of target when the transmission of the data signal is stopped.

According to an embodiment, a flying object is launched from a launching device and flies for a target. The flying object is composed of a sensor device, a processing unit and a communication device. The sensor device observes a peripheral situation of the flying object and outputs observation data showing the observation result. The processing unit generates a data signal which contains the observation data. The communication device transmits the data signal to the launching device.

The observation data contains a flying object parameter and a target parameter. The flying object parameter shows a state of the flying object. The target parameter shows a state of the target and is used for calculation of the interception probability.

According to an embodiment, an interception probability calculating method includes a launching device launching a flying object for a target, the flying object observing an peripheral situation of the flying object, the launching device observing a peripheral situation of the launching device, the flying object transmitting a data signal which contains the observation result by the flying object to the launching device, the launching device receiving the data signal, the launching device outputting interception probability data showing an interception probability that the flying object intercepts the target when the transmission of the data signal is stopped.

According to the embodiment, the launching device which has launched the flying object can earlier know the probability that the flying object intercepted the target.

BRIEF DESCRIPTION OF THE DRAWINGS

FIG. 11 is a sequence diagram showing a configuration example of the interception probability calculating method in the embodiment.

FIG. 12 is a sequence diagram showing a configuration example of the interception probability calculating method in the embodiment.

DESCRIPTION OF THE EMBODIMENTS

Embodiments of an interception probability calculation system, a flying object and an interception probability calculating method according to the present invention will be described below with reference to the attached drawings.

First Embodiment

Figure 1A:
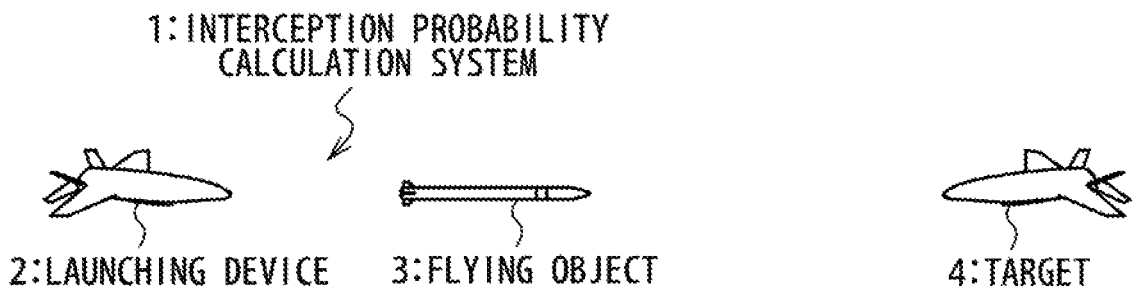
FIG. 1A is a block diagram showing a first state of a configuration example of an interception probability calculation system in an embodiment.
Figure 1B:
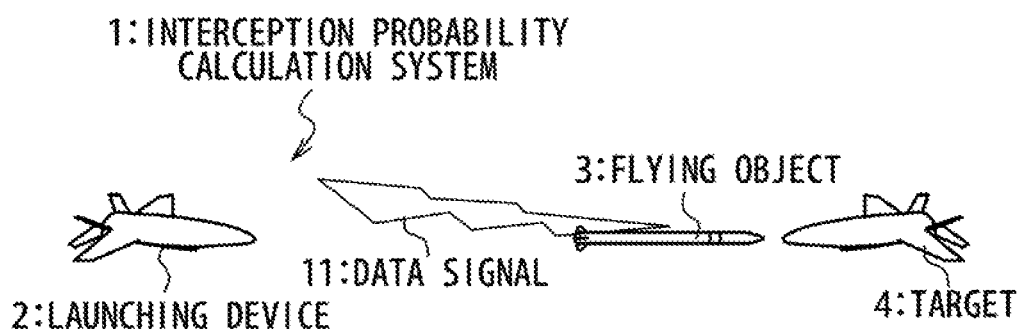
FIG. 1B is a block diagram showing a second state of the configuration example of the interception probability calculation system in the embodiment.
Figure 1C:
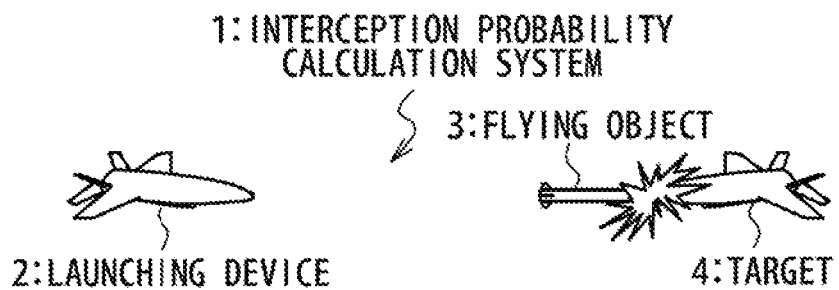
FIG. 1C is a block diagram showing a third state of the configuration example of the interception probability calculation system in the embodiment.

Referring to FIG. 1A to FIG. 1C, a configuration example of an interception probability calculation system 1 in the embodiment will be described. FIG. 1A is a block diagram showing a first state of the configuration example of the interception probability calculation system 1 in the embodiment. FIG. 1B is a block diagram showing a second state of the configuration example of the interception probability calculation system 1 in the embodiment. FIG. 1C is a block diagram showing a third state of the configuration example of the interception probability calculation system 1 in the embodiment.

The interception probability calculation system 1 shown in FIG. 1A to FIG. 1C includes a launching device 2 and a flying object 3. In the first state shown in FIG. 1A, the flying object 3 is launched for a target 4 from the launching device 2. In a second state shown in FIG. 1B, the flying object 3 transmits a data signal 11 to the launching device 2 while flying for the target 4. In a third state shown in FIG. 1C, the flying object 3 intercepts the target 4 and the transmission of the data signal 11 from the flying object 3 to the launching device 2 is cut off.

In this way, in the interception probability calculation system 1 in the embodiment, the launching device 2 is possible to know that the flying object 3 was exploded, by detecting the disruption of the data signal 11 transmitted from the flying object 3. Also, by making the data signal 11 contain observation data of the target 4 by the flying object 3, the launching device 2 can calculate an interception probability of the target 4 by the flying object 3. Alternatively, the flying object 3 calculates the probability that the target 4 can be intercepted by the flying object 3, and informs the calculation result to the launching device 2 through the data signal 11. Hereinafter, the interception probability calculation system 1 and the interception probability calculating method in the embodiment will be described in detail.

Figure 1D:
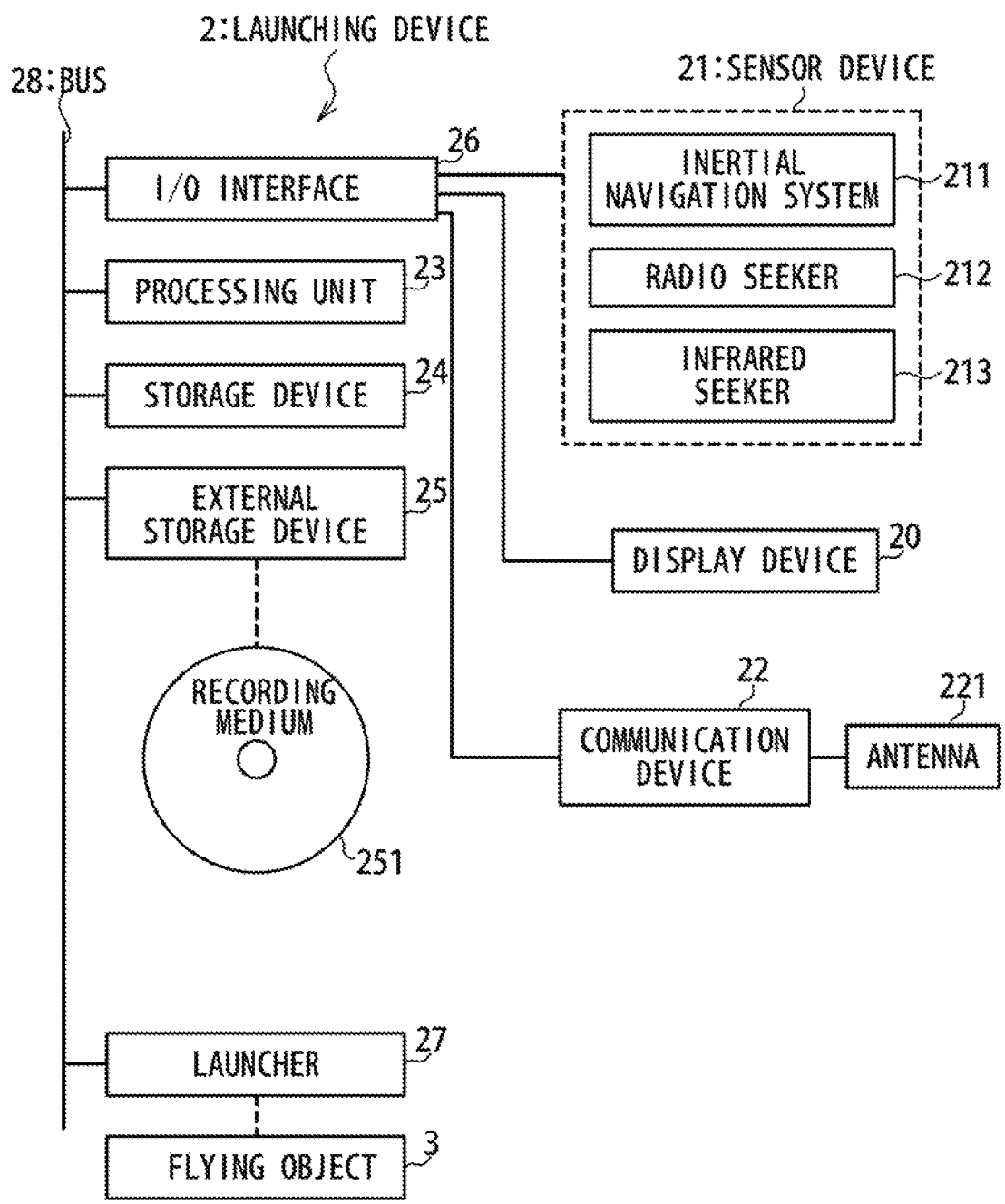
FIG. 1D is a block diagram showing a configuration example of a launching device in the embodiment.

Referring to FIG. 1D, a configuration example of the launching device 2 in the embodiment will be described. FIG. 1D is a block diagram showing a configuration example of the launching device 2 in the embodiment.

The configuration of the launching device 2 will be described. The launching device 2 includes a bus 28, an I/O interface 26, a sensor device 21, a display device 20, a communication device 22, an antenna 221, a processing unit 23, a storage device 24, an external storage device 25 and a launcher 27. The sensor device 21 includes an inertial navigation system 211, a radio seeker 212 and an infrared seeker 213. Note that the sensor device 21 may have a part or whole of the inertial navigation system 211, the radio seeker 212 and the infrared seeker 213. Also, the sensor device 21 may have another radar device and so on.

The connection relation of the components of the launching device 2 will be described. The I/O interface 26, the processing unit 23, the storage device 24, the external storage device 25 and the launcher 27 are connected with each other through the bus 28 communicably. The sensor device 21, the display device 20 and the communication device 22 are connected with the I/O interface 26. Note that a part or whole of the sensor device 21, the display device 20 and the communication device 22 may be directly connected with the bus 28 without passing through the I/O interface 26. The antenna 221 is connected with the communication device 22. The external storage device 25 is connected with a recording medium 251 detachably. The launcher 27 is connected with the flying object 3 detachably.

An operation of the components of the launching device 2 will be described. The bus 28 mediates communication between the components connected with the bus 28. The I/O interface 26 mediates communication between the components connected with the I/O interface 26. The storage device 24 stores a predetermined program and predetermined data and so on. The program and the data may be provided from the recording medium 251 through the external storage device 25 or may be provided from outside through the communication device 22 or the sensor device 21. The processing unit 23 reads and executes the program from the storage device 24, inputs and outputs the data from and to the storage device 24 and controls the sensor device 21, the display device 20, the communication device 22, the launcher 27 and so on. The sensor device 21 observes the peripheral situation of the launching device 2 and stores the observation result in the storage device 24 or notifies to the processing unit 23. The communication device 22 carries out radio communication with the flying object 3 and another communication object through the antenna 221. The display device 20 visibly displays the processing result of the processing unit 23, the data stored in the storage device 24 and so on in an optical signal. Note that the display device 20 may output an acoustic signal in addition to the optical signal. The launcher 27 launches the flying object 3 under the control of the processing unit 23.

Figure 1E:
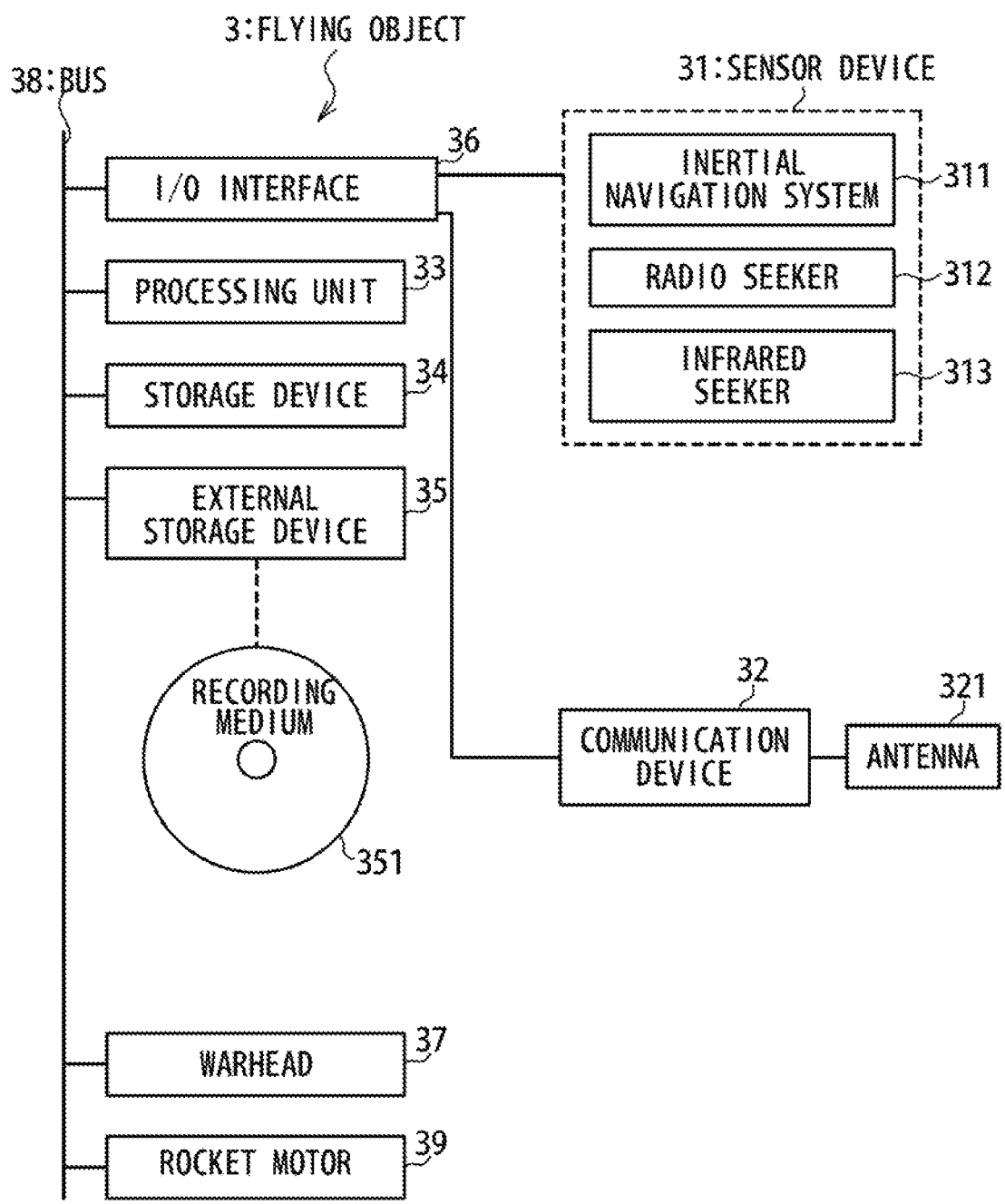
FIG. 1E is a block diagram showing a configuration example of a flying object in the embodiment.

Referring to FIG. 1E, a configuration example of the flying object 3 in the embodiment will be described. FIG. 1E is a block diagram showing a configuration example of the flying object in the embodiment.

The configuration of the flying object 3 will be described. The flying object 3 includes a bus 38, an I/O interface 36, a sensor device 31, a communication device 32, an antenna 321, a processing unit 33, a storage device 34, an external storage device 35, a warhead 37 and a rocket motor 39. The sensor device 31 includes an inertial navigation system 311, a radio seeker 312 and an infrared seeker 313. Note that the sensor device 31 may have a part or whole of the inertial navigation system 311, the radio seeker 312 and the infrared seeker 313, and may have another radar device and so on.

The connection relation of the components of the flying object 3 will be described. The I/O interface 36, the processing unit 33, the storage device 34, the external storage device 35, the warhead 37 and the rocket motor 39 are connected with each other through the bus 38 communicably. The sensor device 31 and the communication device 32 are connected with the I/O interface 36. Note that a part or whole of the sensor device 31 and the communication device 32 may be directly connected with the bus 38 without passing through the I/O interface 36. The antenna 321 is connected with the communication device 32. The external storage device 35 is connected with a recording medium 351 detachably.

An operation of the flying object 3 will be described. The bus 38 mediates communication between the components connected with the bus 38. The I/O interface 36 mediates communication with the components connected with the I/O interface 36. The storage device 34 stores a predetermined program and predetermined data and so on. The program and the data may be provided from the recording medium 351 through the external storage device 35 and may be provided from outside through the communication device 32 or the sensor device 31. The processing unit 33 reads and executes the program from the storage device 34, inputs and outputs the data from and to the storage device 34 and controls the sensor device 31, the communication device 32, the warhead 37, the rocket motor 39 and so on. The sensor device 31 observes the peripheral situation of the flying object 3 and stores the observation result in the storage device 34 or notifies to the processing unit 33. The communication device 32 carries out radio communication with the launching device 2 and another communication object through the antenna 321. The warhead 37 and the rocket motor 39 operate appropriately under control of the processing unit 33.

Figure 2:
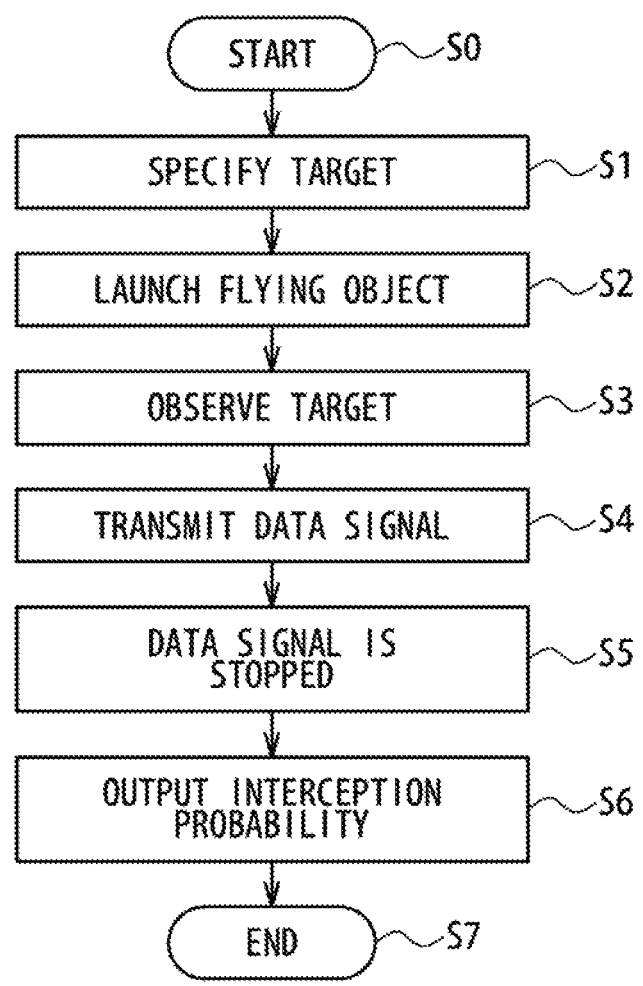
FIG. 2 is a flow chart showing a configuration example of an interception probability calculating method in the embodiment.

Referring to FIG. 2, the operation of the interception probability calculation system 1 in the embodiment, i.e. a configuration example of the interception probability calculating method in the embodiment will be described. FIG. 2 is a flow chart showing the configuration example of the interception probability calculating method in the embodiment.

The flow chart of FIG. 2 includes a start step S0 to end step S7. The flow chart of FIG. 2 starts from the step S0. After the step S0, a first step S1 is executed.

At the first step S1, the launching device 2 specifies the target 4 as the interception object. At this time, the launching device 2 may specify the target 4 based on the observation result by the radio seeker 212 and the infrared seeker 213 in the sensor device 21 and so on and may specify the target 4 based on a notification from outside through the communication device 22. Also, when a plurality of targets 4 are listed up as the choices, the processing unit 23 which executes the program in the storage device 24 may specify one of the targets 4 automatically or a user may specify one of the targets 4 through an input unit manually. In any case, it is desirable that the target data showing the specified target 4 is stored in the storage device 24. Data such as which of an aircraft or a flying object specified target 4 is, and a model, a shape, and flight performance of the specified target 4 may be contained in the target data. After the first step S1, a second step S2 is executed.

At the second step S2, the launching device 2 launches the flying object 3 for the target 4. At this time, desirably, the processing unit 23 executes the program in the storage device 24 to transmit the target data showing the target 4 to the flying object 3 from the storage device 24 through the launcher 27 and the flying object 3 stores the target data in the storage device 34. After the second step S2, a third step S3 is executed.

At the third step S3, the flying object 3 observes the peripheral situation of the flying object 3 while flying for the target 4. At this time, it is desirable that the flying object 3 observes its own position and speed, and observes a position and speed of the target 4. Also, the launching device 2 observes the peripheral situation of the launching device 2. It is desirable that the launching device 2 observes the flying object 3 and the target 4. Here, both of the launching device 2 and the flying object 3 may observe the target 4 and one of them may observe the target 4.

Data of the position and speed of the flying object 3 are contained in data wanted to acquire by the flying object 3 through the observation of the peripheral situation. For example, data of position and speed of the flying object 3 may be acquired from an artificial satellite for GPS (Global Positioning System), the launching device 2 and a ground base station through communication.

Also, data of the position and speed of the flying object 3 in addition to data of the position and speed of the launching device 2 are contained in data wanted to acquire by the launching device 2 through the observation of the peripheral situation of the launching device 2.

Not only the position and speed of the target 4 which are necessary for the flying object 3 to reach the target 4 but also data of the attitude of the target 4 are contained in data to be acquired from the observation result of the target 4. Data of a direction in which the target 4 is oriented in a predetermined three-dimensional coordinate system is contained in the attitude of the target 4.

After third step S3, a fourth step S4 is executed.

At the fourth step S4, the flying object 3 transmits the data signal 11 for the launching device 2. Various data which the flying object 3 has acquired at the third step S3 are contained in the data signal 11. It is desirable that the position and speed of the flying object 3 are contained in the data signal 11 at least. If the flying object 3 has observed the target 4 at the third step S3, it is desirable that data showing the observation result is contained in the data signal 11.

Moreover, the flying object 3 may calculate an interception probability of the target 4 by the flying object 3. In this case, it is desirable that the calculated interception probability is contained in the data signal 11 and transmitted to the launching device 2. A more specific method of calculating the interception probability will be described later.

The flying object 3 can transmit the data signal 11 to the launching device 2. Note that this means that the flying object 3 does not yet meet the target 4 and does not intercept the target 4, so that the flying object 3 does not yet explode. In other words, the launching device 2 can know that the flying object 3 is still operating by receiving the data signal 11.

If the flying object 3 is still flying for the target 4, the third step S3 is executed once again after the fourth step S4. In other words, as far as the flying object 3 continues to fly for the target 4, the third step S3 and the fourth step S4 are repeated alternately or at a same time. Oppositely, when the flying object 3 meets the target 4, or the flying object 3 is intercepted, i.e. when the flying object 3 is exploded, a fifth step S5 is executed after the fourth step S4. Note that strictly, there is a case that the flying object 3 explodes before the fourth step S4 is executed after the third step S3. In such a case, the fifth step S5 may be executed after the third step S3.

At the fifth step S5, the launching device 2 detects that the data signal 11 from the flying object 3 has been stopped. Here, the launching device 2 may determine the stop of the data signal 11 by detecting that the received data signal 11 is in an incomplete condition. Or, the launching device 2 may determine the stop of the data signal 11 by detecting that the next data signal 11 is not received even if a predetermined time passes from the immediately previous reception of the data signal 11.

When detecting that the transmission of the data signal 11 is stopped, the launching device 2 determines that the flying object 3 exploded, and calculates the interception probability of the target 4 by the flying object 3. When the flying object 3 calculates the interception probability that the target 4 is intercepted by the flying object 3 and transmits the calculated interception probability to the launching device 2, the launching device 2 may adopt the interception probability received last as the final interception probability. The more specific method of calculating the interception probability will be described later.

After the fifth step S5, a sixth step S6 is executed.

At the sixth step S6, the launching device 2 outputs the interception probability. It is desirable that this output is optically carried out by the display device 20.

Figure 3:
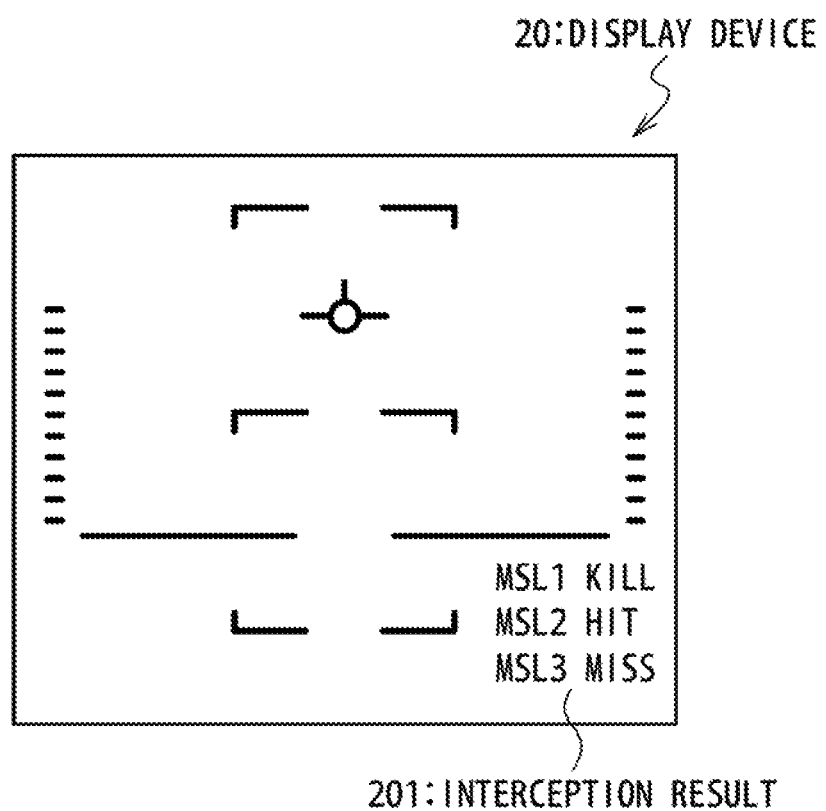
FIG. 3 is a diagram showing an example of a display device in the embodiment.

Referring to FIG. 3, an example of display of the interception probability will be described. FIG. 3 is a diagram showing an example of the display device 20 in the embodiment. The display device 20 shown in FIG. 3 is an example of the display device 20 when the launching device 2 is an aircraft, and an interception result 201 is displayed for the pilot of the aircraft to be easy to see. FIG. 3 does not pass persistently to an example. The interception probability may be displayed in a different position and in a display form other than a character string, and may be informed to a pilot by sound. Knowing the interception probability, the pilot launches the next flying object 3 for the same target 4, operates the aircraft to avoid a counterattack from the same target 4, or operates the aircraft to launch the next flying object 3 for the next target 4. Such determination can be more quickly made.

After the sixth step S6, a seventh step S7 is executed and the interception probability calculating method in the embodiment ends.

As above, the interception probability calculation system 1, the flying object 3 and the interception probability calculating method have been described as the first embodiment. Next, the case where the flying object 3 observes the target 4 and calculates the interception probability will be described in more detailed as a second embodiment.

Second Embodiment

Figure 4:
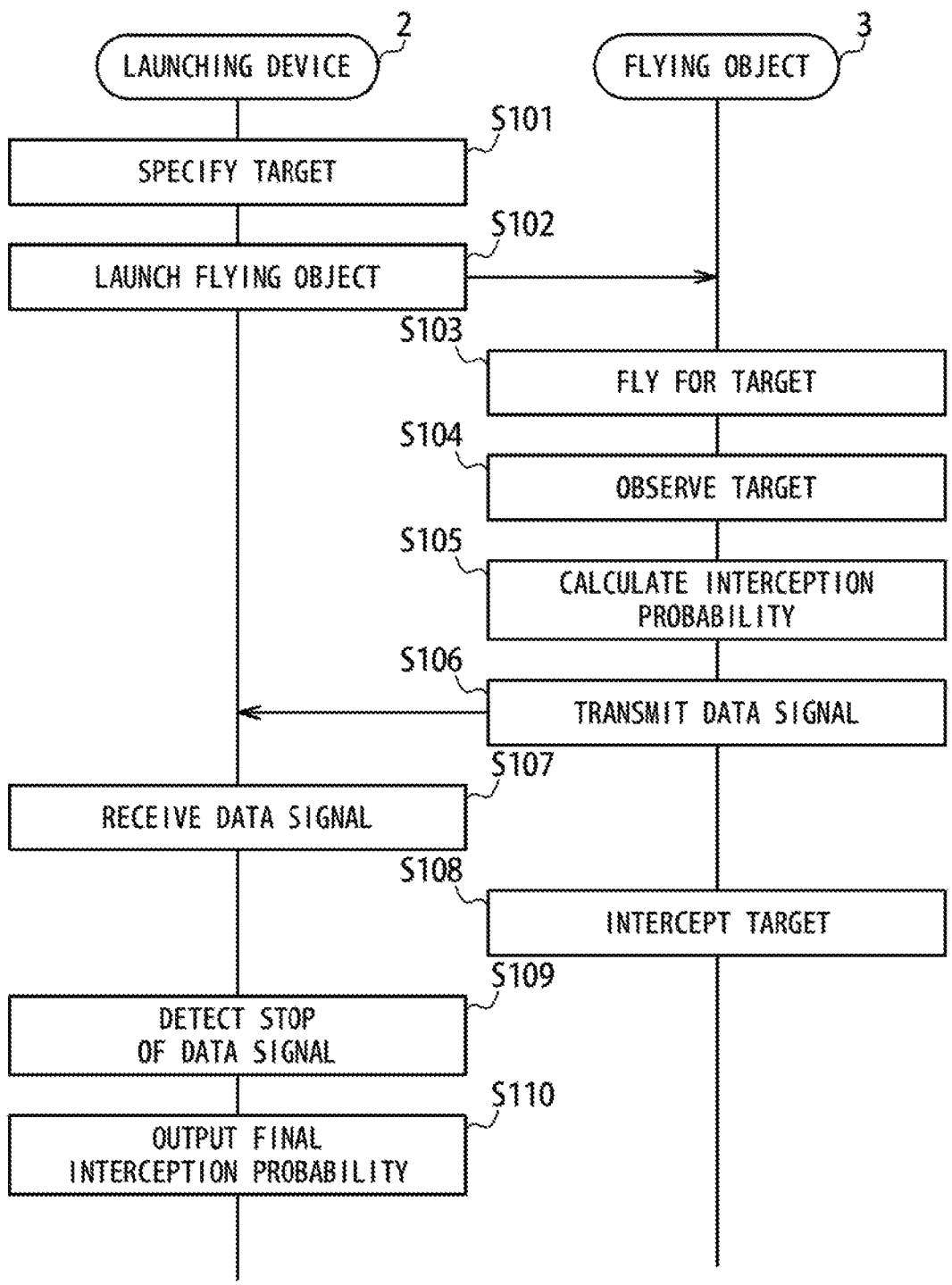
FIG. 4 is a sequence diagram showing a configuration example of the interception probability calculating method in the embodiment.

Referring to FIG. 4, the interception probability calculation system 1, the flying object 3 and the interception probability calculating method when the flying object 3 observes the target 4 and calculates the interception probability will be described. FIG. 4 is a sequence diagram showing a configuration example of the interception probability calculating method in the embodiment.

The sequence diagram of FIG. 4 shows the operation of the launching device 2 and the flying object 3 in each step of the flow chart shown in FIG. 2 more specifically. In the sequence diagram of FIG. 4, a first step S101 is executed.

At the first step S101, the launching device 2 specifies the target 4. The first step 3101 of FIG. 4 corresponds to the first step S1 of FIG. 2. After the first step S101, a second step S102 is executed.

At the second step 3102, the launching device 2 launches the flying object 3 for the target 4. The second step S102 of FIG. 4 corresponds to the second step S2 of FIG. 2. After the second step S102, a third step S103 is executed.

At the third step S103, the flying object 3 flies for the target 4. The third step S103 of FIG. 4 is contained in the third step S3 of FIG. 2. At this time, under control of the processing unit 33 which executes the program stored in the storage device 34, the flying object 3 observes the position and speed of the target 4 by the sensor device 31 and approaches the target 4 by using the thrust of the rocket motor 39 and so on. It is desirable that the flying object 3 detects its own position and speed by the inertial navigation system 311 at this time. After the third step S103, a fourth step S104 is executed. However, actually, it is desirable that the third step S103 and the fourth step S104 are executed at a same time.

At the fourth step S104, the flying object 3 observes the target 4. The fourth step S104 of FIG. 4 is contained in the third step S3 of FIG. 2. The observation at the third step S103 is carried out from the viewpoint that the flying object 3 approaches the target 4. However, the observation at the fourth step S104 is carried out from the viewpoint that the flying object 3 calculates the interception probability of the target 4.

(Radio Seeker)

A case where the target 4 is observed by using the radio seeker 312 of the flying object 3 will be described. The radio seeker 312 observes the target 4 by transmitting radio wave having a predetermined parameter for the target 4, receiving the wave reflected from the target 4 and analyzing the parameter of the reflected wave. Data obtained as the result of such observation are the position of the target 4, the speed of the target 4, and the angle of the target 4. Since these observation results are acquired with respect to the coordinate system for the position, speed and angle of the flying object 3, these data are a relative position, relative velocity and a meeting angle of the target 4 to the flying object 3.

For example, the meeting angle of the target 4 to the flying object 3 is defined as follows. That is, an angle between the direction of the speed vector of the flying object 3 and the direction of the speed vector of the target 4 may be called a meeting angle. Or, it may be defined as follows. That is, an angle between the principal axis in the shape of the flying object 3 and the principal axis in the shape of the target 4 may be called a meeting angle. In case of the definition of the former, the speed data obtained as the observation result can be substantively introduced into the formula for the meeting angle just as it is. Therefore, the meeting angle can be calculated easily and at high speed. On the other hand, in case of the definition of the latter, after the speed data acquired from the observation result are converted into the principal axis direction of the shape by referring to the database of the shapes of the flying object 3 and the target 4, It becomes necessary to introduce the direction into the formula of the meeting angle. Therefore, the calculation of the meeting angle becomes complicated comparatively, and it needs a comparatively long time. However, the calculation precision of the interception probability is improved. In the present embodiment, a case where adopting the definition of the latter will be described.

Note that it is not necessary to carry out the observation at the third step S103 and the observation at the fourth step S104 separately and these observations may be carried out at the same time. It is desirable that the observation result is stored in the storage device 34. After the fourth step S104, a fifth step S105 is executed.

At the fifth step S105, the flying object 3 calculates the interception probability showing the probability to intercept the target 4. At this time, the processing unit 33 reads and executes the program stored in the storage device 34 to read the data of the target 4 observed at the third step 3103 and the fourth step S104 from the storage device 34 to apply the data to a predetermined formula and to execute a predetermined algorithm. Thus, the processing unit 33 calculates the interception probability.

A specific method of calculating the interception probability will be described. It is supposed that the flying object 3 is of a direct hit type. The flying object 3 of the direct hit type intercepts the target 4 by hitting the main unit of the flying object to the target. A case that the flying object 3 is of a non-direct hit type will be described later. For example, a fragment type flying object 3 is contained in the non-direct hit type flying object 3.

Figure 5A:
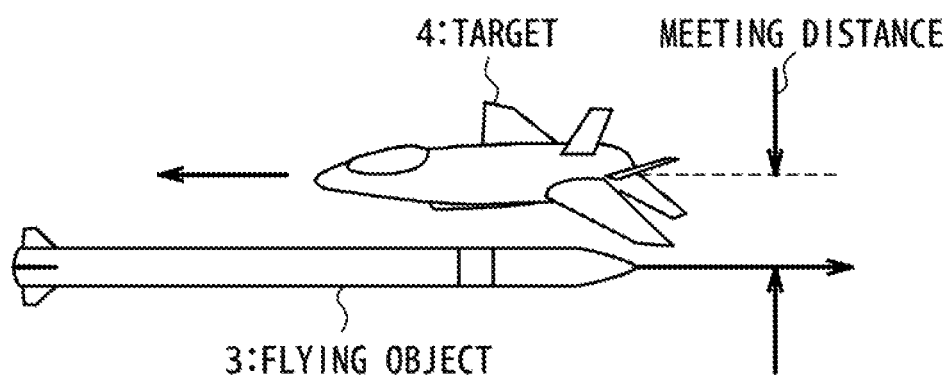
FIG. 5A is a diagram showing a relation between a meeting distance and an interception probability of a direct hit type flying object and a target in the interception probability calculating method in the embodiment.
Figure 5B:
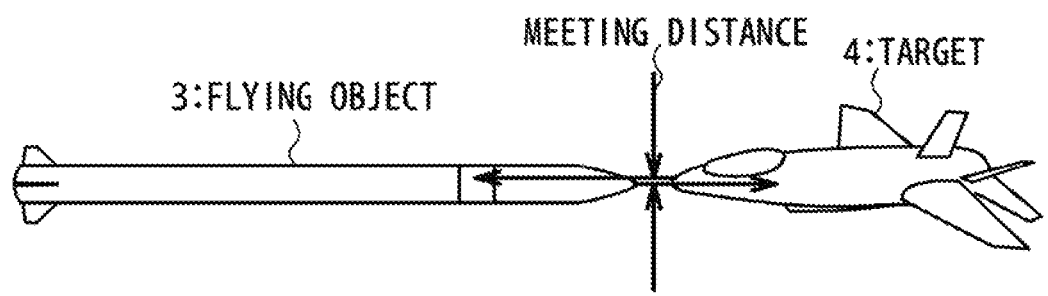
FIG. 5B is a diagram showing relation between the meeting distance and the interception probability of the direct hit type flying object and the target in the interception probability calculating method in the embodiment.

Referring to FIG. 5A and FIG. 5B, a relation between the meeting distance of the flying object 3 and the target 4 and the interception probability will be described. FIG. 5A and FIG. 5B are diagrams for showing the relation between the meeting distance of the direct hit type flying object 3 and the target 4 and the interception probability in the interception probability calculating method.

FIG. 5A and FIG. 5B show a position relation at the time of the meeting between the flying object 3 and the target 4. Comparing FIG. 5A and FIG. 5B, the meeting distance between the flying object 3 and the target 4 is longer in FIG. 5A than in FIG. 5B. Here, a distance at the time of meeting between the flying object 3 and the target 4 is defined as the meeting distance. In other words, a distance between the flying object 3 and the target 4 when the flying object 3 and the target 4 approach most may be defined as the meeting distance.

Basically, in case of a direct hit type flying object 3, the interception probability of the target 4 by the flying object 3 becomes higher when the meeting distance becomes shorter. If the meeting distance is approximately zero as shown in FIG. 5B, it is possible to estimate that the interception probability of the target 4 by a direct hit type flying object 3 is approximately 100%. Oppositely, the interception probability becomes lower when the meeting distance becomes longer. As shown in FIG. 5A, when the meeting distance is enough more than the size of the flying object 3 in a direction orthogonal to the speed direction of the flying object 3 and the size of the target 4 in the direction orthogonal to the speed direction of the target 4, it is possible to estimate that the interception probability is approximately 0%. It is desirable that with respect to a detailed relation of the meeting distance and the interception probability, a table in which values measured through experiments or values calculated by computer simulation are stored, is stored in the storage device 34 of the flying object 3 before launching of the flying object 3.

Note that since an actual interception probability is influenced by the relative velocity and the meeting angle and so on, it is desirable that the relative velocity and the meeting angle are contained in the above-mentioned table in addition to the meeting distance. Or, the interception probability may be defined as a function which uses the meeting distance, the relative velocity and the meeting angle as arguments, and the processing unit 33 may calculate this function successively.

Figure 6A:
FIG. 6A is a diagram showing a relation between a relative velocity and the interception probability of the direct hit type flying object and the target in the interception probability calculating method in the embodiment.
Figure 6B:
FIG. 6B is a diagram showing the relation between the relative velocity and the interception probability of the direct hit type flying object and the target in the interception probability calculating method in the embodiment.

Referring to FIG. 6A and FIG. 6B, a relation between the relative velocity of the flying object 3 and the target 4 and the interception probability will be described. FIG. 6A and FIG. 6B show the relation between the relative velocity of a direct hit type flying object 3 and the target 4 and the interception probability in the interception probability calculating method in the embodiment.

Each of FIG. 6A and FIG. 6B shows the speed vectors of the flying object 3 and the target 4. Comparing FIG. 6A and FIG. 6B, the speed vectors of the target 4 are the same and the speed vectors of the flying object 3 are common in a direction opposite to the speed vector of the target 4. On the other hand, norm of the speed vector of the flying object 3 is larger in FIG. 6B and smaller in FIG. 6A. In this case, the relative velocity of the flying object 3 and the target 4 can be defined as the norm of a differential speed vector between the speed vector of the flying object 3 and the speed vector of the target 4.

Basically, if the relative velocity of the flying object 3 and the target 4 becomes larger, a destruction degree of the target 4 become larger when the flying object 3 comes into contact with the target 4. In other words, when the relative velocity between the flying object 3 and the target 4 becomes larger, the interception probability that the flying object 3 intercepts the target 4 becomes higher. The calculation of the interception probability according to the relative velocities may use the above-mentioned table and the function.

Figure 7A:
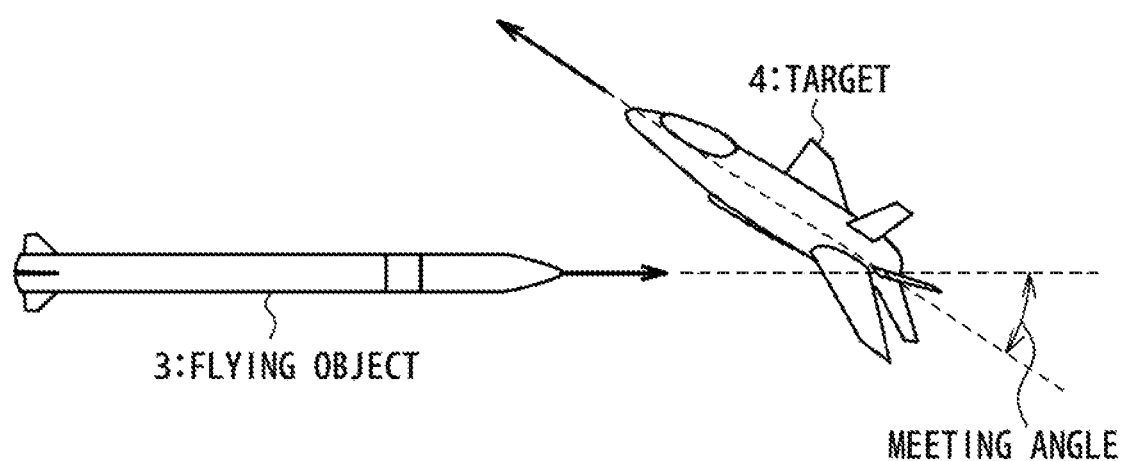
FIG. 7A is a diagram showing the relation between the meeting angle and the interception probability of the direct hit type flying object and the target in the interception probability calculating method in the embodiment.
Figure 7B:
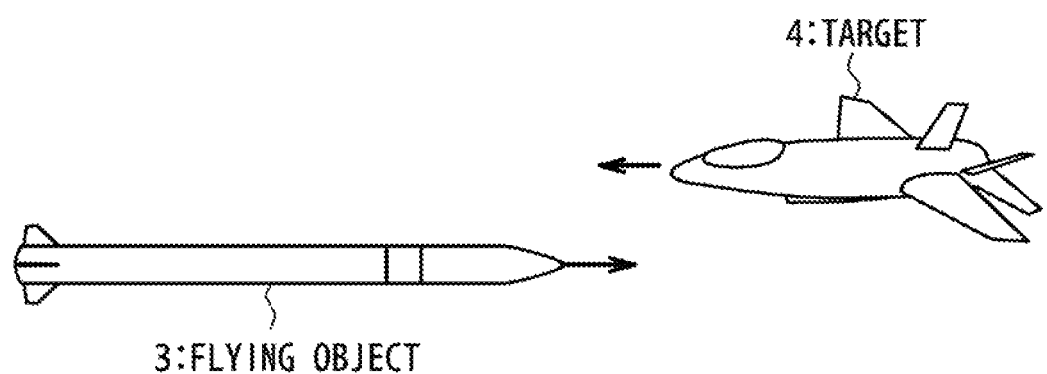
FIG. 7B is a diagram showing the relation between the meeting angle and the interception probability of the direct hit type flying object and the target in the interception probability calculating method in the embodiment.

Referring to FIG. 7A and FIG. 7B, a relation between the meeting angle between the flying object 3 and the target 4 and the interception probability will be described. FIG. 7A and FIG. 7B are diagrams showing a relation between the meeting angle of a direct hit type flying object 3 and the target 4 and the interception probability in the interception probability calculating method in the embodiment.

FIG. 7A and FIG. 7B show the meeting angle between the flying objects 3 and the target 4. As mentioned above, the meeting angle is defined as an angle between the speed vector of the flying object 3 and the speed vector of the target 4. In FIG. 7B, the speed vector of the flying object 3 and the speed vector of the target 4 are parallel and the meeting angle is zero, and therefore illustration is omitted.

The relation between the meeting angle of the flying object 3 and the target 4 and the interception probability can be considered from two different viewpoints.

In the first viewpoint, it is considered that the size of the target 4 seen from the flying object 3 changes with the meeting angle. As an example, supposing that the target 4 is an aircraft or a flying object, the size of the target seen from the flying object 3 is minimized if the meeting angle is approximately zero as in FIG. 7B. Oppositely, if the meeting angle is right-angled approximately, the size of the target seen from the flying object 3 is maximized. If the meeting angle takes an intermediate value as shown in FIG. 7A, the size of the target 4 seen from the flying object 3 becomes an intermediate value. Since the probability that the flying object 3 comes into contact with the target 4 increases when the size of the target seen from the flying object 3 becomes larger, the interception probability, too, increases.

In a second viewpoint, it is considered that a destruction degree of the target 4 is when the flying object 3 comes into contact with the target 4 changes with the meeting angle. Like the above-mentioned example, if the target 4 is an aircraft or a flying object, the destruction degree of the target 4 becomes larger in case of the hitting of the flying object 3 against the target 4, when the meeting angle become smaller. Also, thus, the interception probability becomes larger. Oppositely, when the meeting angle becomes larger, the destruction degree becomes smaller, and the interception probability becomes smaller.

Here, a probability that the flying object 3 comes into contact with the target 4 at the time of meeting, and the destruction degree of the target 4 by the flying object 3 at the time of meeting greatly depends on the shape of the target 4. Therefore, it is desirable that the relation between the meeting angle and the interception probability is measured through experiments and is carried out by a computer simulation, and the measurement or simulation result is stored in a table which is stored in the storage device 34 of the flying object 3 before launching the flying object 3.

As described above, a method of calculating the interception probability of the target 4 by the direct hit type flying object 3 has been described. In above-mentioned explanation, the method of gathering the meeting distance, the relative velocity and the meeting angle to one table or one function and calculating the interception probability has been described. However, as another method, the interception probability of each of the meeting distance, the relative velocity and the meeting angle may be calculated, and a synthetic interception probability may be calculated by multiplying the calculated interception probabilities.

Next, a method of calculating the interception probability of the target 4 by the non-direct hit type flying object 3 will be described. As an example of non-direct hit type flying object 3, a case of fragment type flying object 3 will be described. The fragment type flying object 3 explosively scatters numerous pieces called fragments around the flying object 3, to intercept the targets 4 in the wide area. The direction where the fragments scatter is mainly a radial direction orthogonal to the principal axis of the flying object 3. Since the flight direction of the flying object 3 approximately coincides with the direction of the principal axis of the flying object 3 in many cases, the direction where the fragments scatter would be orthogonal to the flight direction of the flying object 3.

Figure 8A:
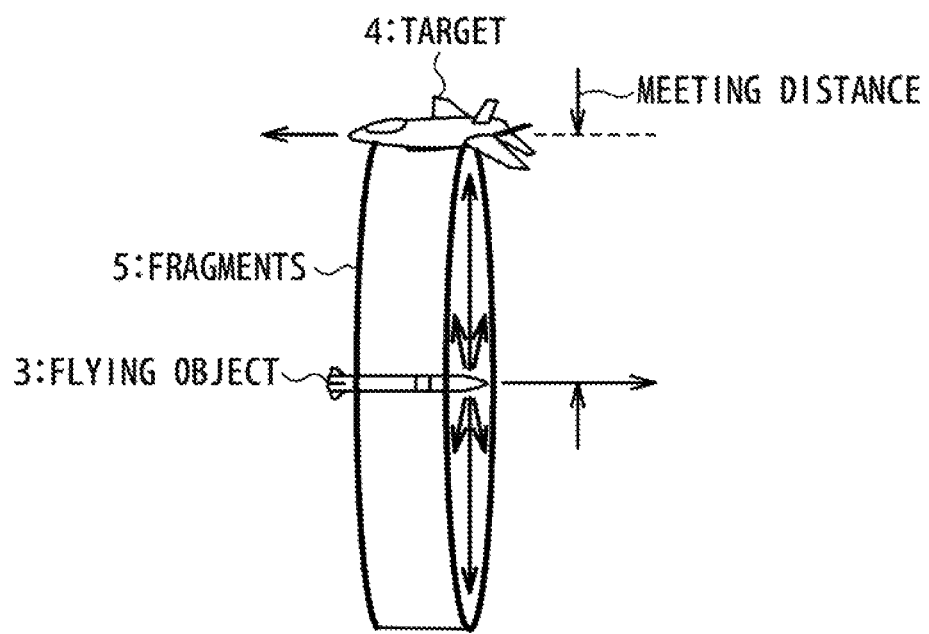
FIG. 8A is a diagram showing a relation between a meeting distance and the interception probability of a non-direct hit type flying object and the target in the interception probability calculating method in the embodiment.
Figure 8B:
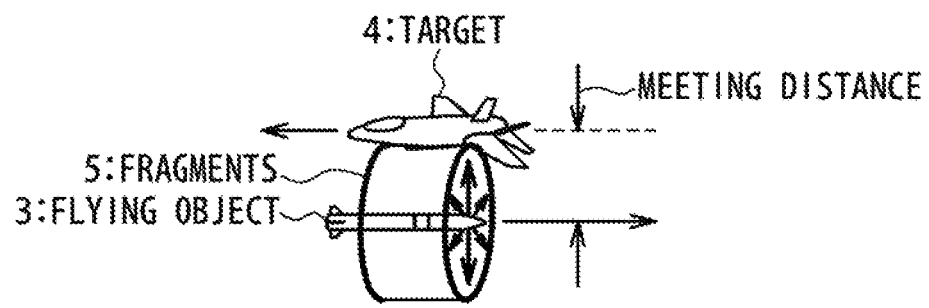
FIG. 8B is a diagram showing the relation between the meeting distance and the interception probability of the non-direct hit type flying object and the target in the interception probability calculating method in the embodiment.

Referring to FIG. 8A and FIG. 8B, a relation between the meeting distance of the non-direct hit type flying object 3 and the target 4 and the interception probability will be described. FIG. 8A and FIG. 8B are diagrams showing the relation between the meeting distance of the non-direct hit type flying object and the target and the interception probability in the interception probability calculating method in the embodiment.

FIG. 8A and FIG. 8B show a position relation of the fragment type flying object 3 and the target 4 at the time of meeting. Comparing FIG. 8A and FIG. 8B, the meeting distance between the flying object 3 and the target 4 is longer in FIG. 8A than FIG. 8B. Here, the meeting distance is defined in the same manner as in the description of FIG. 5A and FIG. 5B.

Basically, in case of the fragment type flying object 3, the interception probability of the target 4 by the flying object 3 becomes higher when the meeting distance becomes shorter. If a total of scattering fragments is the same, the destruction degree of the target 4 becomes higher, when the number of fragments per unit volume, i.e. a density of fragments becomes higher. Therefore, the destruction degree of the target 4 becomes higher in case of FIG. 8B than in case of FIG. 8A, and therefore, the interception probability becomes higher.

Figure 9A:
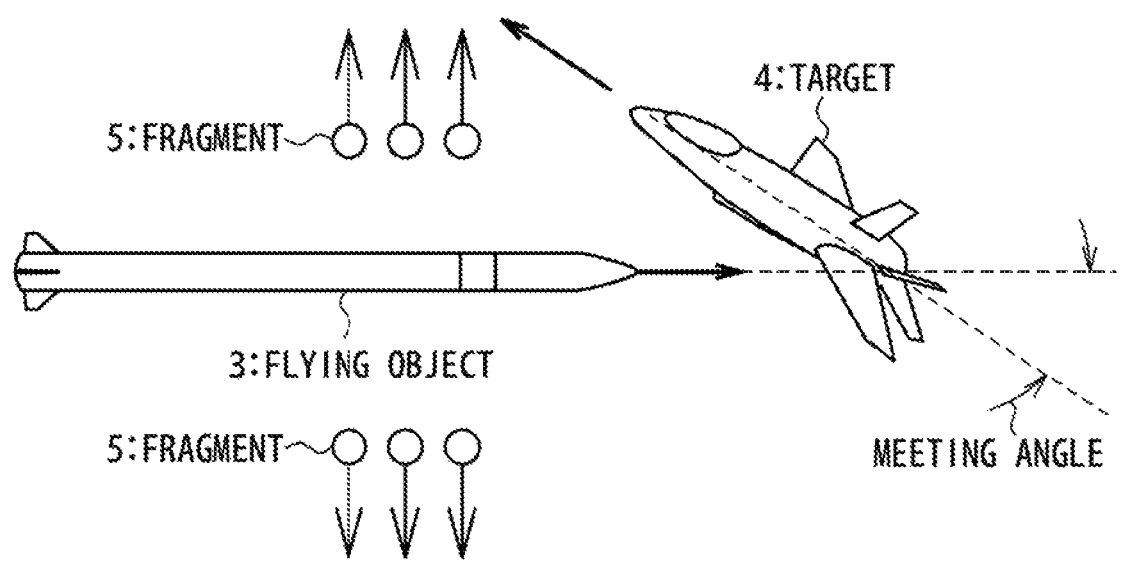
FIG. 9A is a diagram showing the relation between the meeting angle and the interception probability of the non-direct hit type flying object and the target in the interception probability calculating method in the embodiment.
Figure 9B:
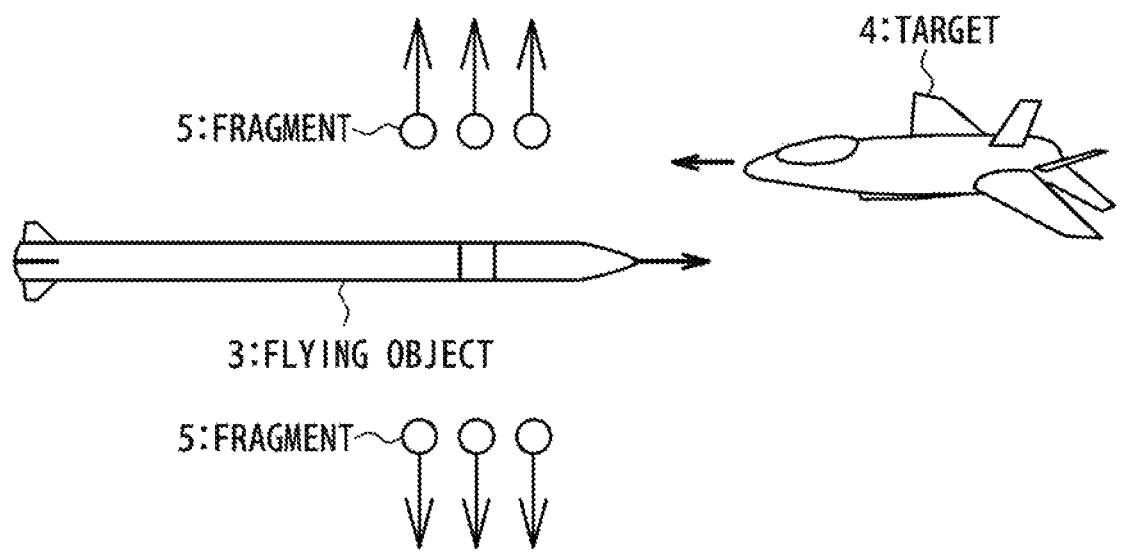
FIG. 9B is a diagram showing the relation between the meeting angle and the interception probability of the non-direct hit type flying object and the target in the interception probability calculating method in the embodiment.

Referring to FIG. 9A and FIG. 9B, a relation between the meeting angle of the non-direct hit type flying object 3 and the target 4 and the interception probability will be described. FIG. 9A and FIG. 9B are diagrams showing the relation between the meeting angle of the non-direct hit type flying object and the target and the interception probability in the interception probability calculating method in the embodiment.

Both of FIG. 9A and FIG. 9B show meeting angles between the fragment type flying object 3 and the target 4. As mentioned above, the meeting angle is defined as an angle between the speed vector of the flying object 3 and the speed vector of the target 4. However, in FIG. 9B, the speed vector of the flying object 3 and the speed vector of the target 4 are parallel, so that the meeting angle is zero, and illustration is omitted.

Different from the direct hit type flying object 3 which has been described with reference to FIG. 7A and FIG. 7B, in the fragment type flying object 3, numerous fragments 5 scatter to a direction orthogonal to the flight direction of the flying object 3. Therefore, when the speed vectors of the flying object 3 and the target 4 are approximately parallel as shown in FIG. 9B, namely, when the meeting angle between the flying object 3 and the target 4 is approximately zero, the size of the target 4 seen from the fragment 5 becomes maximum. This is because the speed vectors of the fragment 5 and the target 4 are approximately orthogonal to each other. Oppositely, when the meeting angle is approximately right-angled, the size of the target 4 seen from the fragment 5 is minimized. Also, if the meeting angle takes an intermediate value as shown in FIG. 9A, the size of the target 4 seen from the fragment 5 takes an intermediate value.

A probability that the fragments 5 come into contact with the target 4 increases, when the size of target 4 seen from the fragment 5 becomes larger. Therefore, the interception probability, too, increases. On the other hand, if the fragment 5 comes into contact with the target 4, the destruction degree of the target 4 becomes smaller, when the size of the target 4 seen externally becomes larger, and therefore, the interception probability becomes smaller. Since this is same as the case of the direct hit type flying object 3 as described with reference to FIG. 7A and FIG. 7B, further detailed description is omitted.

As described above, a method of calculating the interception probability of the target 4 by the non-direct hit type flying object 3 has been described. The interception probability may be calculated by gathering the meeting distance and the meeting angle to one table or one function. Alternately, the synthetic interception probability may be calculated by multiplying the interception probabilities of the meeting distances and the meeting angles.

(Infrared Seeker)

So far, a case of using the radio seeker 312 as the sensor device 31 of the flying object 3 has been described. A case of using the infrared seeker 313 instead of the radio seeker 312 has been described from here with reference to FIG. 10A to FIG. 10F.

The infrared seeker 313 observes the target 4 by analyzing an infrared image 6 of the target 4 imaged with the infrared camera.

Figure 10A:
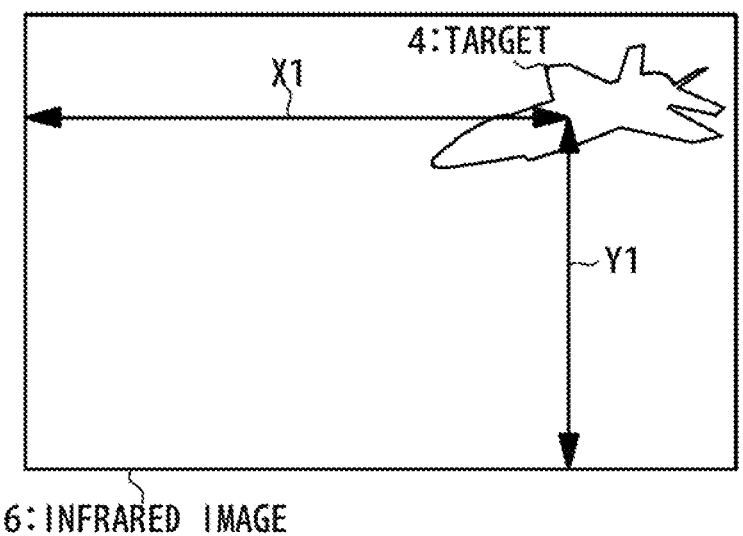
FIG. 10A is a diagram showing a method of calculating a direction of the target from an infrared image of the target in the interception probability calculating method in the embodiment.

Referring to FIG. 10A, a method of calculating the direction of the target 4 with reference to an optical axis of the infrared camera in the infrared seeker 313 will be described. FIG. 10A is a diagram showing the method of calculating the direction of the target 4 from the infrared image 6 of the target 4 in the interception probability calculating method in the embodiment.

FIG. 10A is an example of the infrared image 6 when the infrared seeker 313 images the target 4. The processing unit 33 of the flying object 3 executes the program stored in the storage device 34, to analyze the infrared image 6 and to detect a sight of the target 4. Also, the processing unit 33 can detect the position of the sight of the target 4 in the coordinate axes of the infrared image 6 as the coordinate X1 and the coordinate Y1. Here, the coordinate X1 is a coordinate in the lateral direction in FIG. 10A and the coordinate Y1 is a coordinate in the longitudinal direction in FIG. 10A.

The flying object 3 grasps its own position, speed, angle and so on by the inertial navigation system 311 and so on. Also, the flying object 3 grasps the optical performance of the infrared seeker 313 imaged the infrared image 6, especially, a direction of the optical axis and an angler of view. Therefore, the processing unit 33 of the flying object 3 can calculate a relative position of the target 4 imaged in the infrared image 6 with respect to the flying object 3.

Figure 10B:
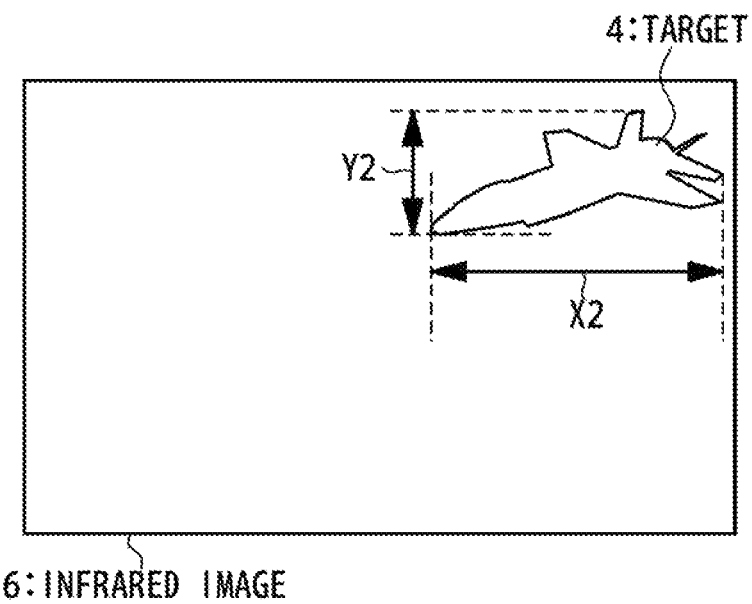
FIG. 10B is a diagram showing a method of calculating a distance from a flying object to the target from the infrared image of the target in the interception probability calculating method in the embodiment.

Referring to FIG. 10B, a method of calculating the distance from the flying object 3 to the target 4 by using the infrared seeker 313 of the flying object 3 will be described. FIG. 10B is a diagram showing the method of calculating the distance from the flying object 3 to the target 4 from the infrared image 6 of the target 4 in the interception probability calculating method in the embodiment.

FIG. 10B is an example of the infrared image 6 of the target 4 imaged with the infrared seeker 313, like FIG. 10A. The processing unit 33 of the flying object 3 executes the program stored in the storage device 34, to detect the size of the sight of the target 4 in the infrared image 6 as a length X2 and a length Y2. The processing unit 33 refers to image data showing the sight of the target 4 stored in the storage device 34 and numerical data showing various kinds of size of the target 4 and calculates the distance from the flying object 3 to the target 4 by substituting the length X2 and the length Y2 into a predetermined equation. Note that this calculation method is only an example, and another calculating method may be used.

By combining the direction of the target 4 seen from the flying object 3 which has been described with reference to FIG. 10A and a distance from the flying object 3 to the target 4 which has been described with reference to FIG. 10B, the position of the target 4 in the coordinate system with respect to the flying object 3 can be calculated.

Figure 10C:
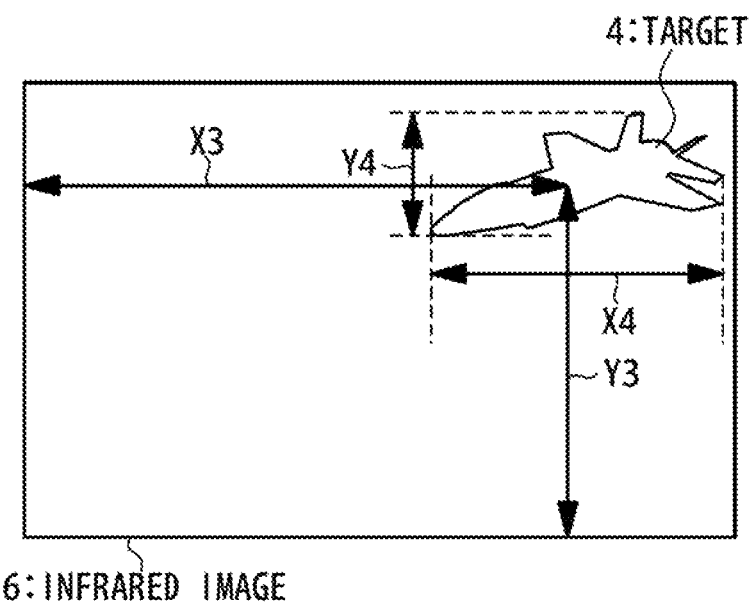
FIG. 10C is a diagram showing a method of calculating a relative velocity between the flying object and the target from the infrared image of the target in the interception probability calculating method in the embodiment.
Figure 10D:
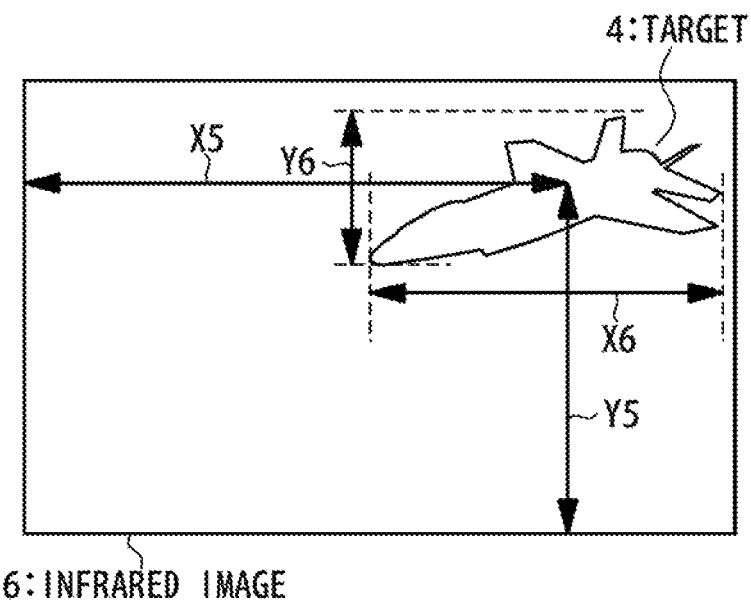
FIG. 10D are a diagram showing a method of calculating the relative velocity of the flying object and the target from the infrared image of the target in the interception probability calculating method in the embodiment.

Referring to FIG. 10C and FIG. 10D, a method of calculating the relative velocity of the flying object 3 and the target 4 by using the infrared seeker 313 will be described. FIG. 10C and FIG. 10D are diagrams showing the method of calculating the relative velocity of the flying object 3 and the target 4 from the infrared image 6 of the target 4 in the interception probability calculating method in the embodiment.

In FIG. 10C, the processing unit 33 of the flying object 3 executes the program stored in the storage device 34 at a first time, to detect the position of the sight of the target 4 in the coordinate axis of the infrared image 6 as a coordinate X3 and a coordinate Y3, and to detect the size of the sight of the target 4 in the infrared image 6 as a length X4 and a length Y4. Moreover, by combining the coordinate X3, the coordinate Y3, the length X4 and the length Y4, the position of the target 4 seen from the flying object 3 at the first time is calculated.

In FIG. 10D, at a second time after a predetermined time passed from the first time, the processing unit 33 of the flying object 3 executes the program stored in the storage device 34, to detect the position of the sight of the target 4 in the coordinate axes of the infrared image 6 as a coordinate X5 and a coordinate Y5, and to detect the size of the sight of the target 4 in the infrared image 6 as a length X6 and a length Y6. Moreover, by combining the coordinate X5, the coordinate Y5, the length X6 and the length Y6, the position of the target 4 seen from the flying object 3 is calculated at the second time.

The speed of the target 4 seen from the flying object 3, i.e. the relative velocity between the flying object 3 and the target 4 can be calculated by dividing the distance from the position of the target 4 seen from the flying object 3 at the first time to the position of the target 4 seen from the flying object 3 at the second time by the time from the first to the second time. At this time, it is desirable that the time from the first time to the second time is short as much as possible, from the viewpoint of improvement of calculation precision of the relative velocity.

The meeting distance between the flying object 3 and the target 4 can be calculated by combining the position of the target 4 with respect to the flying object 3 and the speed of the target 4 with respect to the flying object 3.

Figure 10E:
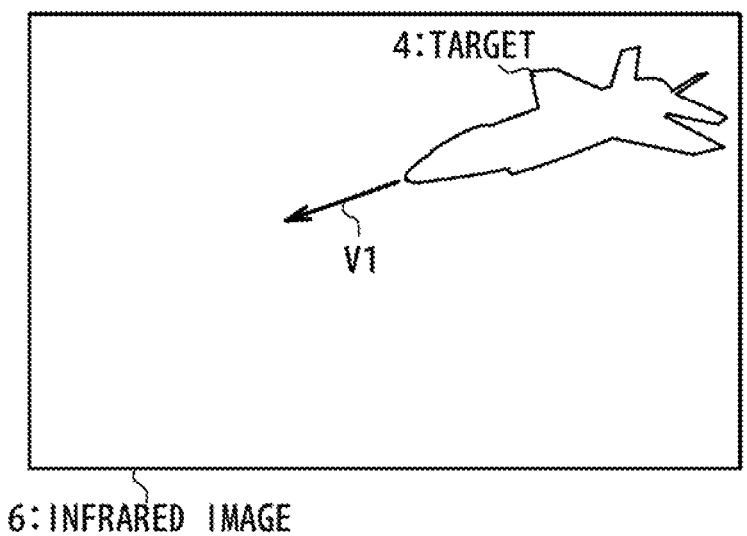
FIG. 10E is a diagram showing a method of calculating a meeting angle between the flying object and the target from the infrared image of the target in the interception probability calculating method in the embodiment.

Referring to FIG. 10E, a method of calculating a relative angle between the flying object 3 and the target 4 by using the infrared seeker 313 of the flying object 3 will be described. FIG. 10E is a diagram showing the method of calculating the meeting angle between the flying object 3 and the target 4 from the infrared image 6 of the target 4 in the interception probability calculating method in the embodiment.

As mentioned above, the meeting angle between the flying object 3 and the target 4 depends on the shapes of the flying object 3 and the target 4. Therefore, the processing unit 33 of the flying object 3 executes the program stored in the storage device 34 to search the sight of the target 4 detected from the infrared image 6 from a database stored in the storage device 34 and to estimate the direction VI of the principal axis in the shape of the target 4. By using data of the direction VI of the principal axis which does not always coincide with the direction of the speed vector of the target 4, the meeting angle between the flying object 3 and the target 4 can be calculated more precisely.

As described above, the calculation method of the interception probability carried out at the fifth step S105 has been described of the sequence diagram of FIG. 4. After the fifth step S105, a sixth step S106 is executed.

At the sixth step S106, the flying object 3 transmits the data signal 11 for the launching device 2. The sixth step S106 of FIG. 4 is contained in the fourth step S4 of FIG. 2. After the sixth step S106, a seventh step S107 is executed.

At the seventh step S107, the launching device 2 receives the data signal 11. The seventh step S107 of FIG. 4 is contained in the fourth step S4 of FIG. 2. After the seventh step S107, an eighth step S108 is executed.

At the eighth step S108, the flying object 3 intercepts the target 4. The eighth step S108 of FIG. 4 is contained in the fifth step S5 of FIG. 2. Since the flying object 3 is destroyed when intercepting the target 4, the transmission of data signal 11 stops necessarily and automatically. After the eighth step S108, a ninth step S109 is executed.

At the ninth step S109, the launching device 2 detects the stop of the transmission of data signal 11. The ninth step S109 of FIG. 4 is contained in the fifth step S5 of FIG. 2. After the ninth step S109, a tenth step S110 is executed.

At the tenth step S110, the launching device 2 outputs a final interception probability. The tenth step S110 of FIG. 4 corresponds to the sixth step S6 of FIG. 2. When the tenth step S110 ends, the sequence diagram of FIG. 4 ends.

As mentioned above, the interception probability calculation system 1, the flying object 3 and the interception probability calculating method according to the second embodiment when the flying object 3 observes the target 4 and calculates the interception probability have been described.

Third Embodiment

Referring to FIG. 11, the interception probability calculation system 1, the flying object 3 and the interception probability calculating method when the flying object 3 observes the target 4 and the launching device 2 calculates the interception probability will be described. FIG. 11 is a sequence diagram showing a configuration example of the interception probability calculating method in the embodiment.

The sequence diagram of FIG. 11 shows specific operations of the flying object 3 and the launching device 2 in each step of the flow chart shown in FIG. 2. The sequence diagram of FIG. 11 is composed of 10 steps is composed of a first step S201 to a tenth step S210. Since the sequence diagram of FIG. 11 has many points common to the sequence diagram of FIG. 4 described as the second embodiment, the difference between both of the sequence diagrams will be described mainly.

In the sequence diagram of FIG. 11, the first step S201 is executed, and then a second step S202, a third step S203 and a fourth step S204 are executed. Since the first step S201 to the fourth step S204 of FIG. 11 correspond to the first step S101 to the fourth step S103 of FIG. 4 respectively, further detailed description is omitted. After the fourth step S204 of FIG. 11, a fifth step S205 is executed.

At the fifth step S205, the flying object 3 transmits the data signal 11 to the launching device 2. The fifth step S205 corresponds to the sixth step S106 of FIG. 4 but is different in the following point. That is, since the flying object 3 does not calculate the interception probability in the present embodiment, the data signal 11 is transmitted at the fifth step S205 without containing the interception probability. Instead, the data signal 11 transmitted at the fifth step S205 contains a part or all of the observation result of the target 4 by the flying object 3, the position, speed and angle of the flying object 3, and so on which are necessary for the launching device 2 to calculate the interception probability. After the fifth step S205, a sixth step S206 is executed.

Since the sixth step S206 corresponds to the seventh step S107 of FIG. 4, further detailed explanation will be omitted. After the sixth step S206, a seventh step S207 is executed.

At the seventh step S207, the launching device 2 calculates the interception probability. The seventh step S207 is same in the calculation of the interception probability as the fifth step S105 of FIG. 4, but is different in the following point. That is, the launching device 2 calculates the interception probability with reference to the observation result of the target 4 by the launching device 2 in addition to the observation result of the target 4 by the flying object 3. After the seventh step S207, an eighth step S208 is executed, and moreover, a ninth step S209 and a tenth step S210 are executed. Since the eighth step S208 to the tenth step S210 correspond to the eighth step S108 to the tenth step S110 of FIG. 4, respectively, further detailed explanation is omitted.

In the present embodiment, since the launching device 2 calculates the interception probability, it is possible to decrease the cost of the flying object 3 by simplifying the processing unit 33 of the flying object 3.

As mentioned above, the interception probability calculation system 1, the flying object 3 and the interception probability calculating method in the third embodiment will be described in which the flying object 3 observes the target 4, and the launching device 2 calculates the interception probability.

Fourth Embodiment

Referring to FIG. 12, the interception probability calculation system 1, the flying object 3 and the interception probability calculating method when both of the launching device 2 and the flying object 3 observe the target 4 and the launching device 2 calculates the interception probability will be described. FIG. 12 is a sequence diagram showing a configuration example of the interception probability calculating method in the embodiment.

The sequence diagram of FIG. 12 shows the more specific operations of the launching device 2 and the flying object 3 at each step of the flow chart shown in FIG. 2. The sequence diagram of FIG. 12 is composed of a first step S301 to a third step S303, two fourth steps S304A and S304B, and a fifth step S305 to a tenth step S310. Since the sequence diagram of FIG. 12 has many points common to the sequence diagram of FIG. 11 in the third embodiment, a difference between them will be described mainly.

FIG. 12 is composed of a first step S301 to a third step S303, and a fifth step S305 to a tenth step S310 which respectively correspond to the first step S201 to the third step S203 and the fifth step S205 to the tenth step S210 in FIG. 11. Also, two steps S204A and S204B are added in FIG. 12 instead of the step S204 in FIG. 11. Here, at a fourth step S304A, the launching device 2 observes the target 4. Also, at the fourth step S304B, the flying object 3 observes the target 4. The two fourth steps S304A and S304B may be executed at the same time.

At the fourth step S304A, the launching device 2 observes the target 4 by using the radio seeker 212 or the infrared seeker 213, like the case of the flying object 3 observing the target 4, in the fourth step S204 of FIG. 11. Since the observation by the radio seeker 212 of the launching device 2 is same as the observation by the radio seeker 312 of the flying object 3, further detailed description is omitted. The observation by the infrared seeker 213 of the launching device 2 is also same as the observation by the infrared seeker 313 of the flying object 3, further detailed description is omitted.

At the fourth step S304B, the observation of the target 4 by the flying object 3 is carried out. Since the fourth step S304B is same as the fourth step S204 of FIG. 11, further detailed description is omitted. After the fourth steps S304A and S304B, the fifth step S305 to the tenth step S310 are executed like the sequence diagram of FIG. 11.

In the present embodiment, since the interception probability is calculated by using the observation results more than in the third embodiment, the interception probability of a higher precision can be acquired.

As mentioned above, the interception probability calculation system 1, the flying object 3 and the interception probability calculating method in the fourth embodiment have been described when both of the launching device 2 and the flying object 3 observe the target 4 and the launching device 2 calculates an interception probability.

Fifth Embodiment

Figure 13:
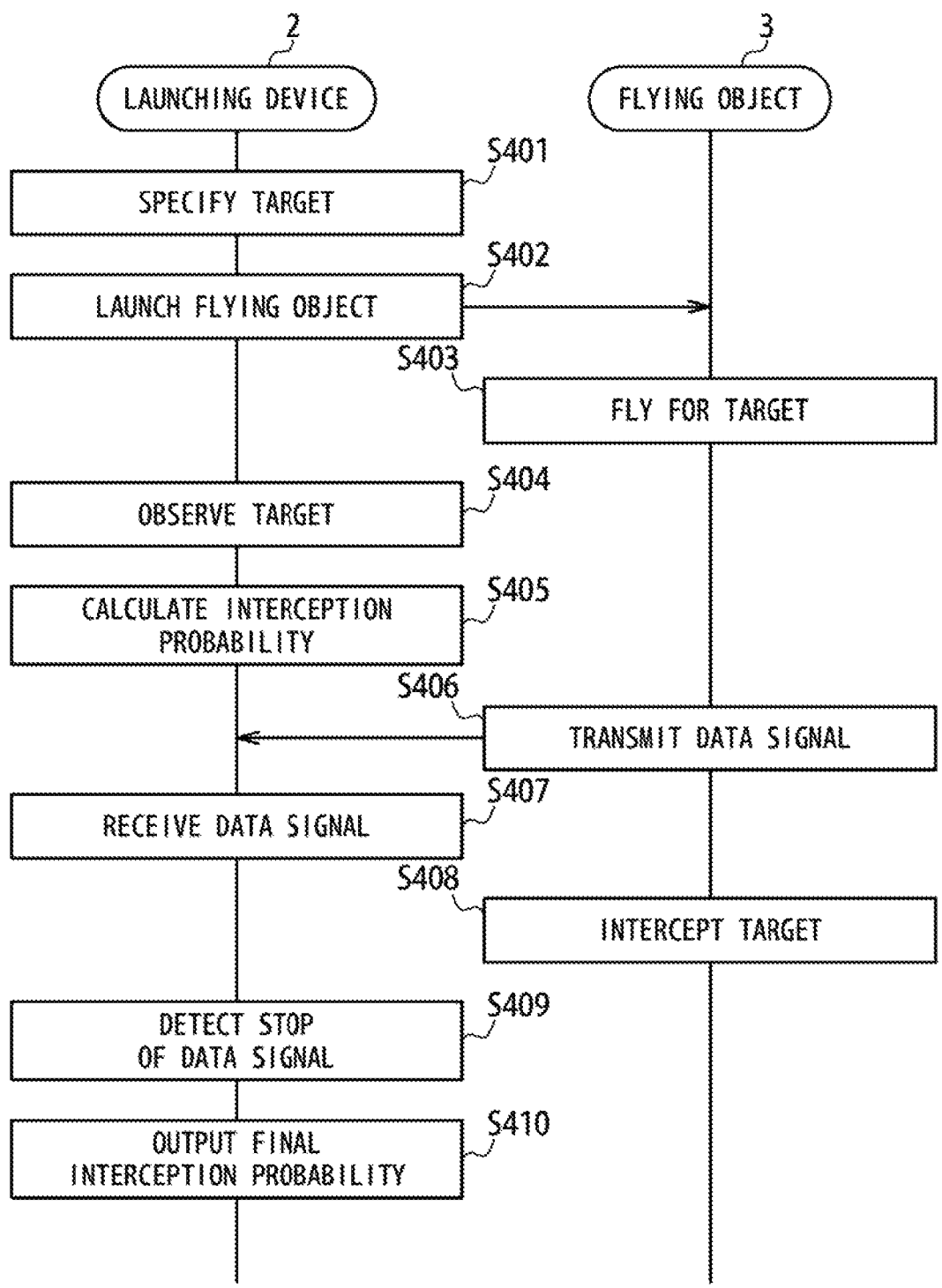
FIG. 13 is a sequence diagram showing a configuration example of the interception probability calculating method in the embodiment.

Referring to FIG. 13, the interception probability calculation system 1, the flying object 3 and the interception probability calculating method when the launching device 2 observes the target 4 and calculates the interception probability will be described. FIG. 13 is a sequence diagram showing a configuration example of the interception probability calculating method in the embodiment.

The sequence diagram of FIG. 13 shows specific operations of the launching device 2 and the flying object 3 in the flow chart shown in FIG. 2. The sequence diagram of FIG. 13 is composed of a first step S401 to a tenth step S410. Since FIG. 13 has many points common to FIG. 12 in the fourth embodiment, a difference between both will be described mainly.

In the sequence diagram of FIG. 13, a first step S401 executed, and then a second step S402 and then a third step S403 are executed. Since the first step S401 to the third step S403 of FIG. 13 correspond to the first step S301 to the third step S303 of FIG. 12, further detailed description is omitted.

After the third step S403 of FIG. 13, a fourth step S404 is executed. At the fourth step S404, the launching device 2 observes the target 4. Since the fourth step S404 of FIG. 13 corresponds to the fourth step S304A in FIG. 12, further detailed description is omitted. After the fourth step S404, a fifth step 9405 is executed.

At the fifth step S405, the launching device 2 calculates the interception probability. The fifth step S405 of FIG. 13 corresponds to the seventh step S307 of FIG. 12 but is different in the following point. That is, the launching device 2 calculates the interception probability without using the observation result of the target 4 by the flying object 3. In other words, the launching device 2 calculates the interception probability by using only the observation result of the flying object 3 and the target 4 by the launching device 2. After the fifth step S405, a sixth step S406 is executed.

When the sixth step S406 is executed, the flying object 3 transmits the data signal 11 to the launching device 2. The sixth step S406 of FIG. 13 corresponds to the fifth step S305 of FIG. 12 but is different in the following point. That is, since the flying object 3 does not carry out the observation of the target 4 and the calculation of the interception probability in the present embodiment, the data of the observation result of the target 4 by the flying object 3 and the interception probability are not contained in the data signal 11. In other words, the data signal 11 has a role for communicating that the flying object 3 is in a well state, to the launching device 2. After the sixth step S406, a seventh step S407 is executed.

At the seventh step S407, the launching device 2 receives data signal 11. The seventh step S407 of FIG. 13 corresponds to the sixth step S306 of FIG. 12 but is different in the following point. That is, as described at the sixth step S406, the data signal 11 does not contain the data of the observation result of the target 4 by the flying object 3 and the interception probability. In the launching device 2 can know whether the flying object 3 is in a well state, by receiving the data signal 11. After the seventh step S407, an eighth step S408 is executed, and moreover, a ninth step S409 and the tenth step S410 are executed. Since the eighth step S408 to the tenth step S410 correspond to the eighth step S308 to the tenth step S310 in FIG. 12, respectively, further detailed description is omitted.

In this embodiment, since few functions are requested for the flying object 3 from the viewpoint of the observation of the target 4, the communication with the launching device 2 and so on, it is possible to save the cost according to the manufacture and operation of the flying object 3.

In the fifth embodiment, the interception probability calculation system 1, the flying object 3 and the interception probability calculating method when the launching device 2 observes the target 4, and calculates the interception probability willed be described.

The present invention has been described based on the embodiments. However, the present invention is not limited to the embodiments, and various types of change or modification are possible in the range of the gist of the present invention. Also, the features described in the embodiments may be combined freely in a range in which any technical contradiction does not occur.

What is claimed is:

1. An interception probability calculation system comprising:
   a flying object configured to fly for a target; and
   a launching device configured to launch the flying object,
   wherein the flying object comprises:
   a first sensor device configured to observe a peripheral situation of the flying object and output first observation data showing an observation result;
   a first processing unit configured to generate a data signal which contains the first observation data; and
   a first communication device configured to transmit the data signal to the launching device, and
   wherein the launching device comprises:
   a second sensor device configured to observe a peripheral situation of the launching device and output second observation data showing an observation result;
   a second communication device configured to receive the data signal; and
   a second processing unit configured to output an interception probability showing a probability that the flying object intercepts the target, when the transmission of the data signal is stopped.

2. The interception probability calculation system according to claim 1,
wherein the data signal contains a first flying object parameter showing a state of the flying object, and a first target parameter showing a state of the target,
wherein the second observation data contains a second flying object parameter showing a state of the flying object,
wherein the first processing unit is configured to generate the first flying object parameter and the first target parameter based on the peripheral situation of the flying object,
wherein the first processing unit is configured to use the first flying object parameter and the first target parameter to calculate the interception probability, and
wherein the data signal contains interception probability data showing the interception probability.

3. The interception probability calculation system according to claim 2,
wherein the first sensor device comprises:
a first inertial navigation system configured to measure a position of the flying object and a speed of the flying object; and
a first infrared seeker configured to image an infrared image of the target with an infrared camera and output the infrared image,
wherein the flying object further comprises:
a first storage device configured to store target data showing a shape of the target, and
wherein the first processing unit is configured to refer to the target data to analyze the infrared image, and calculate, as the first target parameter, at least one of a distance between the flying object and the target, a relative velocity between the flying object and the target or a meeting angle between the flying object and the target.

4. The interception probability calculation system according to claim 2,
wherein the first sensor device comprises:
a first inertial navigation system configured to measure a position of the flying object and a speed of the flying object; and
a first radio seeker configured to measure a position of the target and a speed of the target, and
wherein the first processing unit is configured to calculate, as the first target parameter, at least one of a distance between the flying object and the target, a relative velocity between the flying object and the target or a meeting angle between the flying object and the target.

5. The interception probability calculation system according to claim 1,
wherein the data signal contains a first flying object parameter showing a state of the flying object, and a first target parameter showing a state of the target,
wherein the second observation data contains a second flying object parameter showing a state of the flying object,
wherein the first processing unit is configured to generate the first flying object parameter and the first target parameter based on the peripheral situation of the flying object,
wherein the second sensor device is configured to generate the second flying object parameter based on the peripheral situation of the launching device, and
wherein the second processing unit is configured to use the first flying object parameter, the second flying object parameter and the first target parameter to calculate the interception probability.

6. The interception probability calculation system according to claim 5,
wherein the first sensor device comprises:
a first inertial navigation system configured to measure a position of the flying object and a speed of the flying object; and
a first infrared seeker configured to image an infrared image of the target with an infrared camera and output the infrared image,
wherein the launching device further comprises a second storage device configured to store target data showing a shape of the target, and
wherein the second processing unit is configured to refer to the target data to analyze the infrared image, and calculate, as the second observation data, at least one of a distance between the flying object and the target, a relative velocity between the flying object and the target or a meeting angle between the flying object and the target.

7. The interception probability calculation system according to claim 5,
wherein the first sensor device comprises:
a first inertial navigation system configured to measure a position of the flying object and a speed of the flying object; and
a first radio seeker configured to measure a position of the target and a speed of the target, and
wherein the second processing unit is configured to calculate, as the second observation data, at least one of a distance between the flying object and the target, a relative velocity between the flying object and the target or a meeting angle between the flying object and the target.

8. The interception probability calculation system according to claim 1,
wherein the data signal contains a first flying object parameter showing a state of the flying object, and a first target parameter showing a state of the target,
wherein the second observation data contains a second flying object parameter showing a state of the flying object and a second target parameter showing a state of the target,
wherein the first processing unit is configured to generate the first flying object parameter and the first target parameter based on the peripheral situation of the flying object,
wherein the second sensor device is configured to generate the second flying object parameter and the second target parameter based on the peripheral situation of the launching device, and
wherein the second processing unit is configured to use the first flying object parameter, the second flying object parameter, the first target parameter and the second target parameter to calculate the interception probability.

9. The interception probability calculation system according to claim 8,
wherein the first sensor device comprises:
a first inertial navigation system configured to measure a position of the flying object and a speed of the flying object, wherein the second sensor device comprises:
a second inertial navigation system configured to measure a position of the launching device and a speed of the launching device; and
a second infrared seeker configured to image an infrared image of the target with an infrared camera and output the infrared image,
wherein the launching device further comprises a second storage device configured to store target data showing a shape of the target, and
wherein the second processing unit is configured to refer to the target data to analyze the infrared image, and calculate, as the second observation data, at least one of a distance between the flying object and the target, a relative velocity between the flying object and the target or a meeting angle between the flying object and the target.

10. The interception probability calculation system according to claim 8,
wherein the first sensor device comprises a first inertial navigation system configured to measure a position of the flying object and a speed of the flying object,
wherein the second sensor device comprises:
a second observation navigation system configured to measure and a position of the launching device and a speed of the launching device; and
a second radio seeker configured to measure position of the target and a speed of the target, and
wherein the second processing unit is configured to calculate, as the second observation data, at least one of a distance between the flying object and the target, a relative velocity between the flying object and the target or a meeting angle between the flying object and the target.

11. The interception probability calculation system according to claim 1,
wherein the data signal contains a first flying object parameter showing a state of the flying object,
wherein the second observation data contains a second flying object parameter showing a state of the flying object, and a second target parameter showing a state of the target,
wherein the first processing unit is configured to generate the first flying object parameter based on the peripheral situation of the flying object,
wherein the second sensor device is configured to generate the second flying object parameter and the second target parameter based on the peripheral situation of the launching device, and
wherein the second processing unit is configured to use the first flying object parameter, the second flying object parameter and the second target parameter to calculate the interception probability.

12. A flying object configured to be launched from a launching device for a target, the flying object comprising:
a sensor device configured to observe a peripheral situation of the flying object and output observation data showing the observation result;
a processing unit configured to generate a data signal which contains the observation data; and
a communication device configured to transmit the data signal to the launching device, wherein the observation data comprises:
a flying object parameter showing a state of the flying object; and
a target parameter showing a state of the target, the target parameter being used to calculate an interception probability showing a probability that the flying object intercepts the target, and
wherein the interception probability is to be used to determine an action of the launching device when the transmission of the data signal from the flying object to the launching device is stopped.

13. The flying object according to claim 12,
wherein the processing unit is configured to carry out processing of the target parameter to calculate the interception probability, and
wherein the data signal contains interception probability data showing the interception probability.

14. The flying object according to claim 13, wherein the sensor device comprises:
an inertial navigation system configured to measure a position of the flying object and a speed of the flying object; and
an infrared seeker configured to image an infrared image of the target with an infrared camera and output the infrared image,
wherein the flying object further comprises a first storage device configured to store target data showing a shape of the target, and
wherein the processing unit is configured to refer to the target data to analyze the infrared image, and calculate, as the target parameter, at least one of a distance between the flying object and the target, a relative velocity between the flying object and the target or a meeting angle between the flying object and the target.

15. The flying object according to claim 13, wherein the sensor device comprises:
an inertial navigation system configured to measure a position of the flying object and a speed of the flying object; and
a radio seeker configured to measure a position of the target and a speed of the target, and
wherein the processing unit is configured to calculate, as the target parameter, at least one of a distance between the flying object and the target, a relative velocity between the flying object and the target or a meeting angle between the flying object and the target.

16. An interception probability calculating method comprising:
launching, by a launching device, a flying object for a target;
observing, by the flying object, a peripheral situation of the flying object;
observing, by the launching device, a peripheral situation of the launching device;
transmitting a data signal, which contains an observation result by the flying object, from the flying object to the launching device;
receiving the data signal by the launching device; and
outputting, by the launching device, interception probability data showing a probability that the flying object intercepts the target when the transmission of the data signal is stopped.

* * * * *